US012570395B2

(12) United States Patent
Buskirk et al.

(10) Patent No.: US 12,570,395 B2
(45) Date of Patent: Mar. 10, 2026

(54) WINGLET CONTROL SURFACES AND METHODS FOR USE THEREWITH

(71) Applicant: REGENT Craft Inc., North Kingstown, RI (US)

(72) Inventors: Bradley C. Buskirk, Charlotte, NC (US); Brett C. Peters, Warwick, RI (US)

(73) Assignee: REGENT Craft Inc., North Kingstown, RI (US)

( * ) Notice: Subject to any disclaimer, the term of this patent is extended or adjusted under 35 U.S.C. 154(b) by 0 days.

(21) Appl. No.: 18/613,578

(22) Filed: Mar. 22, 2024

(65) Prior Publication Data

US 2024/0326990 A1     Oct. 3, 2024

Related U.S. Application Data

(60) Provisional application No. 63/456,092, filed on Mar. 31, 2023.

(51) Int. Cl.
| | |
|---|---|
| *B64C 23/06* | (2006.01) |
| *B64C 9/04* | (2006.01) |
| *B64C 35/00* | (2006.01) |
| B64C 9/00 | (2006.01) |

(52) U.S. Cl.
CPC .............. *B64C 23/076* (2017.05); *B64C 9/04* (2013.01); *B64C 35/007* (2013.01); *B64C 2009/005* (2013.01)

(58) Field of Classification Search
CPC ....... B64C 23/076; B64C 9/04; B64C 35/007;

B64C 2009/005; B64C 35/00; B64C 35/001; B64C 35/006; B64C 35/008; B64C 23/069; B64C 23/072
See application file for complete search history.

(56)                  References Cited

U.S. PATENT DOCUMENTS

| | | |
|---|---|---|
| 1,840,716 A | 1/1932 | Hitt |
| 1,861,491 A | 6/1932 | Capelis |
| 1,881,141 A | 10/1932 | Igor |
| 2,214,945 A | 9/1940 | Weihmiller |
| 2,400,173 A | 5/1946 | Slate |
| 2,793,827 A | 5/1957 | Ries et al. |

(Continued)

FOREIGN PATENT DOCUMENTS

| | | |
|---|---|---|
| CN | 104199462 A | 12/2014 |
| CN | 107010199 B | 12/2021 |

(Continued)

OTHER PUBLICATIONS

Non-Final Office Action in U.S. Appl. No. 17/845,480, dated Apr. 24, 2025 (14 pages).

(Continued)

*Primary Examiner* — Magdalena Topolski
*Assistant Examiner* — Anna L. Gordon
(74) *Attorney, Agent, or Firm* — Crowell & Moring LLP

(57)                  ABSTRACT

Various control surfaces are disclosed that can cause a side force along a lateral axis running through a center of mass of a craft when the control surfaces are deployed in a same direction. The side force can be created without creating a yawing moment on the craft. The control surfaces can be on a winglet of the craft. Also disclosed are a split-flap control surface and stand-alone ailerons.

20 Claims, 23 Drawing Sheets

(56) References Cited

U.S. PATENT DOCUMENTS

| | | | |
|---|---|---|---|
| 2,844,339 | A | 7/1958 | Stroukoff |
| 2,942,810 | A | 6/1960 | Hanning-Lee |
| 3,082,975 | A | 3/1963 | Cardwell et al. |
| 3,139,059 | A | 6/1964 | Hanford |
| 3,498,247 | A | 3/1970 | Handler |
| 3,750,978 | A | 8/1973 | Cunningham |
| 4,080,922 | A | 3/1978 | Brubaker |
| 4,449,683 | A | 5/1984 | Kratzer et al. |
| 4,484,721 | A | 11/1984 | Gue |
| 4,499,843 | A | 2/1985 | Williams |
| 4,589,611 | A * | 5/1986 | Ramme ............... B64C 27/26 244/6 |
| 4,926,773 | A | 5/1990 | Manor |
| 4,930,725 | A | 6/1990 | Thompson et al. |
| 4,962,978 | A | 10/1990 | Weston |
| 5,018,686 | A | 5/1991 | Zimmer |
| 5,100,081 | A | 3/1992 | Thomas |
| 6,086,014 | A | 7/2000 | Bragg |
| 6,547,181 | B1 | 4/2003 | Hoisington et al. |
| 6,732,672 | B2 | 5/2004 | Shin |
| 7,275,493 | B1 | 10/2007 | Brass |
| 7,322,872 | B2 | 1/2008 | Butler et al. |
| D594,811 | S | 6/2009 | Cazals |
| 7,744,038 | B2 | 6/2010 | Sankrithi et al. |
| 8,152,095 | B2 | 4/2012 | Cazals et al. |
| 8,371,520 | B2 | 2/2013 | Easter |
| 8,651,431 | B1 | 2/2014 | White et al. |
| 8,876,044 | B2 | 11/2014 | Cazals et al. |
| 9,096,312 | B2 | 8/2015 | Moxon |
| 9,156,550 | B2 | 10/2015 | Nam |
| 9,688,356 | B2 | 6/2017 | Schulz |
| 9,889,920 | B2 | 2/2018 | Harding et al. |
| D843,919 | S | 3/2019 | Tzarnotzky et al. |
| 10,507,930 | B2 | 12/2019 | Keller |
| D872,681 | S | 1/2020 | Tzarnotzky et al. |
| D873,200 | S | 1/2020 | Langford et al. |
| D873,202 | S | 1/2020 | Tzarnotzky et al. |
| D921,565 | S | 6/2021 | Vander Lind |
| 11,370,508 | B1 | 6/2022 | Dugger et al. |
| 11,420,738 | B1 | 8/2022 | Thalheimer et al. |
| D966,147 | S | 10/2022 | Merrill |
| D988,226 | S | 6/2023 | Bevirt et al. |
| D988,926 | S | 6/2023 | Prager et al. |
| 11,667,352 | B2 | 6/2023 | Leason et al. |
| D996,339 | S | 8/2023 | Moris et al. |
| 11,787,551 | B1 | 10/2023 | Graves et al. |
| D1,005,211 | S | 11/2023 | Cummings |
| D1,007,366 | S | 12/2023 | Moris et al. |
| D1,009,696 | S | 1/2024 | Tao et al. |
| D1,009,697 | S | 1/2024 | Hesselbarth |
| 12,006,033 | B1 | 6/2024 | Villa et al. |
| 12,006,035 | B1 | 6/2024 | De Paiva et al. |
| 12,006,048 | B2 | 6/2024 | Bevirt et al. |
| 12,017,764 | B2 | 6/2024 | Long |
| 12,084,173 | B2 | 9/2024 | Schaefer |
| 12,116,139 | B2 | 10/2024 | Klinker et al. |
| 12,129,887 | B2 | 10/2024 | Halcom |
| D1,051,012 | S | 11/2024 | Alafinov |
| D1,053,780 | S | 12/2024 | Tran et al. |
| D1,066,119 | S | 3/2025 | Thalheimer et al. |
| 2007/0245943 | A1 | 10/2007 | Rice |
| 2014/0312177 | A1 | 10/2014 | Gaonjur |
| 2016/0280332 | A1 | 9/2016 | Schulz et al. |
| 2017/0253322 | A1 * | 9/2017 | Krebs ................. B64C 39/04 |
| 2017/0308099 | A1 | 10/2017 | Kim et al. |
| 2018/0343050 | A1 | 11/2018 | Tillotson |
| 2019/0291863 | A1 | 9/2019 | Lyasoff et al. |
| 2021/0223385 | A1 | 7/2021 | Breton et al. |
| 2022/0046177 | A1 | 2/2022 | Honjo et al. |
| 2022/0119113 | A1 * | 4/2022 | Wilson ............... B64C 23/076 |
| 2022/0223049 | A1 | 7/2022 | Lavretsky et al. |
| 2022/0250743 | A1 | 8/2022 | Thalheimer et al. |
| 2022/0324560 | A1 | 10/2022 | Klinker et al. |
| 2022/0382300 | A1 | 12/2022 | Larson et al. |
| 2023/0021836 | A1 | 1/2023 | Riddle et al. |
| 2023/0062717 | A1 | 3/2023 | Thalheimer et al. |
| 2023/0257108 | A1 * | 8/2023 | Page ............... B64C 39/10 244/199.4 |
| 2023/0358888 | A1 | 11/2023 | Lustig et al. |
| 2023/0409049 | A1 * | 12/2023 | Isler ............... B64C 9/06 |
| 2024/0158091 | A1 | 5/2024 | Klinker et al. |
| 2024/0182157 | A1 | 6/2024 | Ivanco |
| 2024/0182165 | A1 | 6/2024 | Skulskis |
| 2024/0190567 | A1 | 6/2024 | Vora et al. |
| 2024/0208646 | A1 | 6/2024 | Bower |
| 2024/0208648 | A1 | 6/2024 | Klinker et al. |
| 2024/0208658 | A1 | 6/2024 | Graves et al. |
| 2024/0326990 | A1 | 10/2024 | Buskirk et al. |
| 2025/0074617 | A1 | 3/2025 | Kays et al. |

FOREIGN PATENT DOCUMENTS

| | | | |
|---|---|---|---|
| DE | 20 2016 000269 | U1 | 2/2016 |
| EP | 2605955 | B1 | 2/2020 |
| EP | 3 018 053 | B1 | 5/2023 |
| GB | 2347909 | | 9/2000 |
| JP | 20181657792 | A | 11/2018 |
| KR | 101615720 | B1 | 4/2016 |
| RU | 2661277 | | 7/2018 |
| WO | WO 2022/173948 | A1 | 8/2022 |
| WO | WO 2023/091202 | A1 | 5/2023 |

OTHER PUBLICATIONS

Non-Final Office Action in U.S. Appl. No. 17/892,484, dated Apr. 23, 2025 (15 pages).

Ex Parte Quayle Action in U.S. Appl. No. 29/874,053 dated May 7, 2025 (25 pages).

International Search Report and Written Opinion in International Application No. PCT/US2024/048937, dated Nov. 6, 2024 (13 pages).

Notice of Allowance in U.S. Appl. No. 29/874,061, dated Nov. 1, 2024 (5 pages).

International Search Report and Written Opinion mailed May 30, 2022 for International Application No. PCT/US2022/015979.

Gavrilović, N. et al.; "Commercial aircraft performance improvement using winglets"; *FME Transactions* vol. 43, No. 1; Jan. 2015; 8 pages.

Dimino, I. et al.; "Integrated design of a morphing winglet for active load control and alleviation of turboprop regional aircraft"; *Applied Sciences* vol. 11, No. 5; Mar. 9, 2021; 27 pages.

"Canard (Aeronautics)"; Wikipedia page; downloaded from the Internet on Mar. 21, 2024 at https://en.wikipedia.org/wiki/Canard_(aeronautics); Mar. 4, 2021; 12 pages.

"Rutan Long-EZ"; Wikipedia page; downloaded from the Internet on Mar. 21, 2024 at https://en.wikipedia.org/wiki/Rutan_Long-EZ; Mar. 9, 2023; 6 pages.

"Northrop Grumman B-2 Spirit"; Wikipedia page; downloaded from the Internet on Mar. 21, 2024 at https://en.wikipedia.org/wiki/Northrop_Grumman_B-2_Spirit; Oct. 8, 2019; 34 pages.

"Control surfaces of aircraft | elevons | ruddervators | flaperons | stabilator"; YouTube Video; downloaded from the Internet on Mar. 21, 2024 at https://www.youtube.com/watch?v=WOOVf1VkcA; Jul. 25, 2020 by Engineering Concepts; 2 pages.

"Aileron"; Wikipedia page; downloaded from the Internet on Mar. 21, 2024 at https://en.wikipedia.org/wiki/Aileron; Oct. 31, 2019; 9 pages.

U.S. Appl. No. 17/570,090, filed Jan. 6, 2022, entitled "Wing In-Ground Effect Vehicle."

U.S. Appl. No. 63/490,342, filed Mar. 14, 2023.

Notice of Allowance in U.S. Appl. No. 17/570,090, dated Apr. 1, 2024 (9 pages).

Supplemental Notice of Allowability in U.S. Appl. No. 17/570,090, dated Jun. 10, 2022 (2 pages).

U.S. Non-Final Office Action in U.S. Appl. No. 17/885,463, dated Apr. 17, 2024 (10 pages).

U.S. Non-Final Office Action in U.S. Appl. No. 17/885,523, dated Jul. 17, 2024.

(56)                    References Cited

OTHER PUBLICATIONS

U.S. Non-Final Office Action in U.S. Appl. No. 29/874,061, dated May 31, 2024 (7 pages).
Design U.S. Appl. No. 29/874,053, filed Apr. 13, 2023, entitled "Winged Vehicle, Toy, and/or Replica Model Thereof."
Design U.S. Appl. No. 29/874,061, filed Apr. 13, 2023, entitled "Winged Vehicle, Toy, and/or Replica Model Thereof."
Design U.S. Appl. No. 29/874,056, filed Apr. 13, 2023, entitled "Winged Vehicle, Toy, and/or Replica Model Thereof."
Van Beek, C.M., et al., "Progress Report on Aerodynamic Analysis of a Surface Piercing Hydrofoil-Controlled Wing-In-Ground Effect SEABUS Configuration" Presented at RTO AVT Symposium on "Fluid Dynamics Problems of Vehicles Operating near or in the Air-Sea Interface," held in Amsterdam, The Netherlands, Oct. 5-8, 1998 and published in RTO MP-15 (21 pages).
Alcock, Charles, "How Electric Propulsion and Blown-Wing Technology Have Liberated Aircraft Design", Jan. 14, 2022 (3 pages).
"Geyiie Die Cast Airplanes Toys, Army Plane Toys Set for Kids 3-12, Fighter Jet Military Transport Helicopter with Rot . . . " amazon.com., post Published Unavailable. Retrieved May 28, 2024. Available online at URL:https://www.amazon.com/Geyiie-Airplanes-Military-Transport-Helicopter/dp/B0CCCMPTWD/ref=sr (Year: 2021).
"LM19—A Drone with Camera for Beginners, WiFi Live Video Remote Control Drones for Kids 8-12, Easy & . . . " amazon.com, post Published Aug. 24, 2023. Retrieved May 28, 2024. Available online at URL:https://www.amazon.com/LMRC-Beginners-Airplane-Quadcopter-Batteries/dp/B0CGHRNHM3/ref=sr_1_7?crid=t (Year: 2023).
International Preliminary Report on Patentability in International Application No. PCT/US2022/015979, dated Aug. 15, 2023 (10 pages).
International Search Report and Written Opinion in International Application No. PCT/US2022/040012 dated Nov. 17, 2022 (11 pages).
International Preliminary Report on Patentability in PCT/US2022/040012, dated May 2, 2024 (8 pages).
International Search Report and Written Opinion in International application No. PCT/US2024/058436 dated Feb. 20, 2025 (78 pages).
Ex Parte Quayle Action in U.S. Appl. No. 29/874,053 dated Feb. 19, 2025 (30 pages).
"Electric 'seagliders' that skim overwater could make ferries a thing of the past" CNN.com travel post Published Jun. 12, 2024. Retrieved Feb. 18, 2025 Available online at: https://www.cnn.com/travel/regent-electric-seagliders-abu-dhabl-spc/index.html (2021) (13 pages).
"Electric seaplane maker secures first order en route to accelerate ecofriendly air travel" electrek.co. post published Mar. 21, 2023, retrieved Feb. 18, 2025. Available online at https://electrek.co/2023/03/21/electric-seaplane-maker-secures-first-order (2021) (8 pages).
Office Action issued in U.S. Appl. No. 17/875,942 dated Jun. 20, 2025 (23 pages).

* cited by examiner

HULL-BORNE OPERATION

HYDROFOIL-BORNE
MANEUVERING OPERATION

HYDROFOIL-BORNE TAKEOFF
OPERATION

WING-BORNE
OPERATION

1100

1175    1150

1100

1150

1175

FIG. 16A
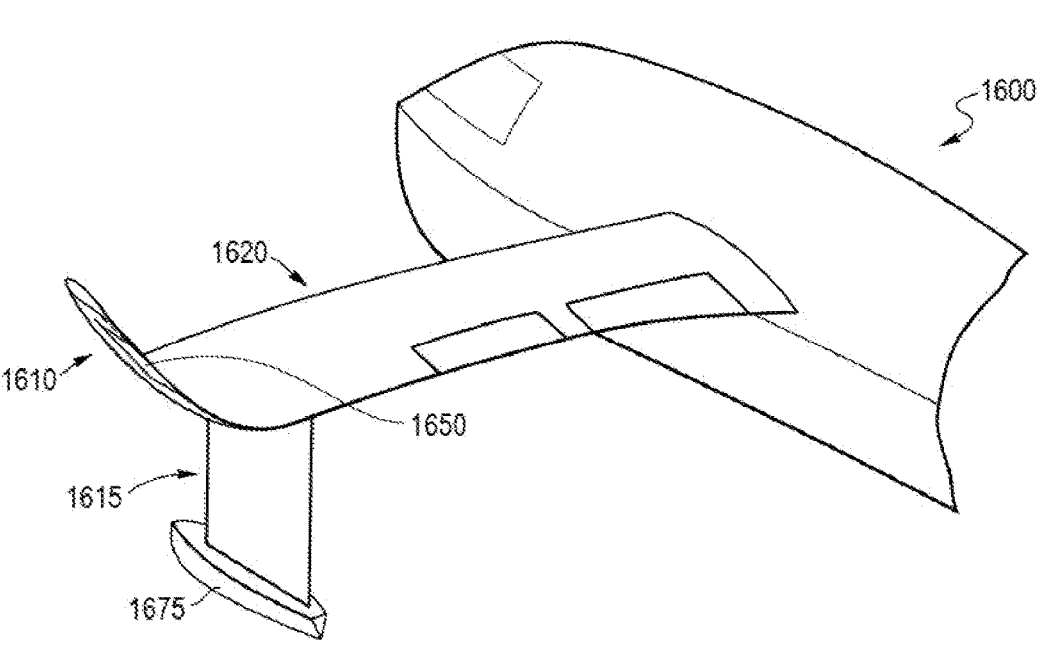
FIG. 16B
FIG. 16C
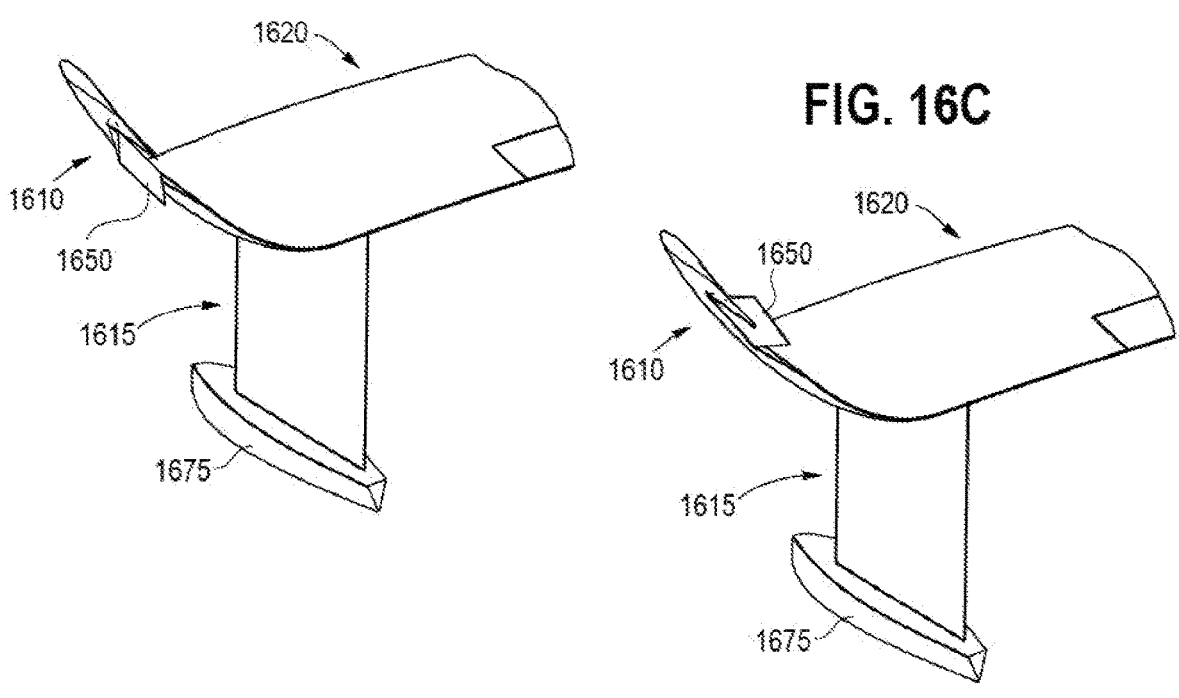

WINGLET CONTROL SURFACES AND METHODS FOR USE THEREWITH

CROSS-REFERENCE TO RELATED APPLICATION

This application claims priority to U.S. Provisional Patent Application No. 63/456,092, filed Mar. 31, 2023, which is hereby incorporated by reference.

BACKGROUND

A craft can use control surfaces to change aerodynamic forces to maneuver the craft. Some crafts are capable of traveling above water while remaining close to the surface of the water. One example of such a craft is a wing-in-ground effect vehicle, which can include a propulsion source and an aerodynamic surface that are designed to operate close to the water surface in aerodynamic ground effect. Crafts other than wing-in-ground effect vehicles can use control surfaces to maneuver the craft.

BRIEF DESCRIPTION OF THE DRAWINGS

FIG. 16A is a rear, port view of a portion of a craft of an embodiment having an upward-bending winglet with a winglet control surface in a non-deployed position.

FIG. 16B is a rear, port view of a portion of a craft of an embodiment having an upward-bending winglet with a winglet control surface in a deployed-port position.

FIG. 16C is a rear, port view of a portion of a craft of an embodiment having an upward-bending winglet with a winglet control surface in a deployed-starboard position.

DETAILED DESCRIPTION

Figure 1A:
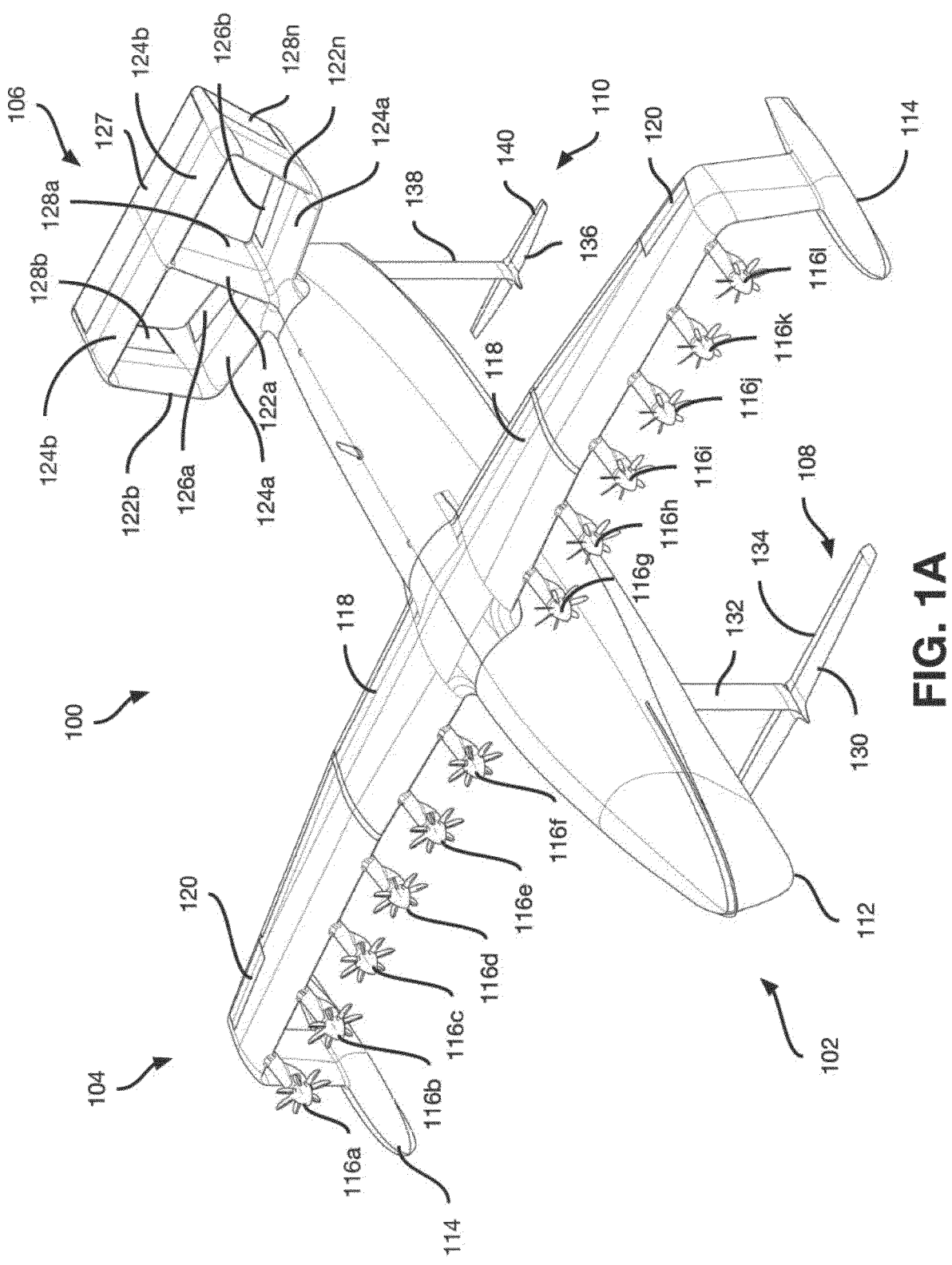
FIGS. 1A-1D is an illustration of a craft of an embodiment.
Figure 1B:
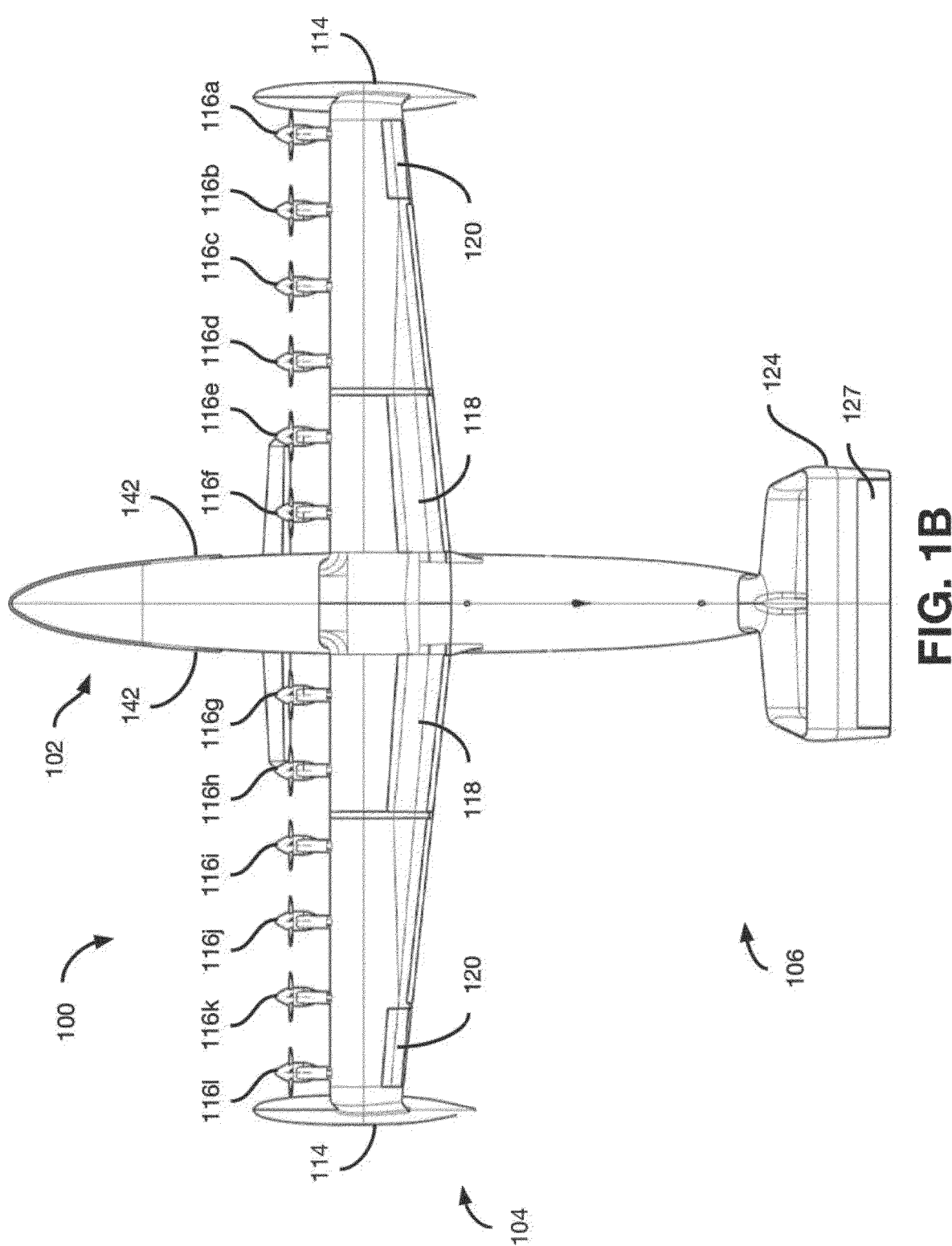
Figure 1C:
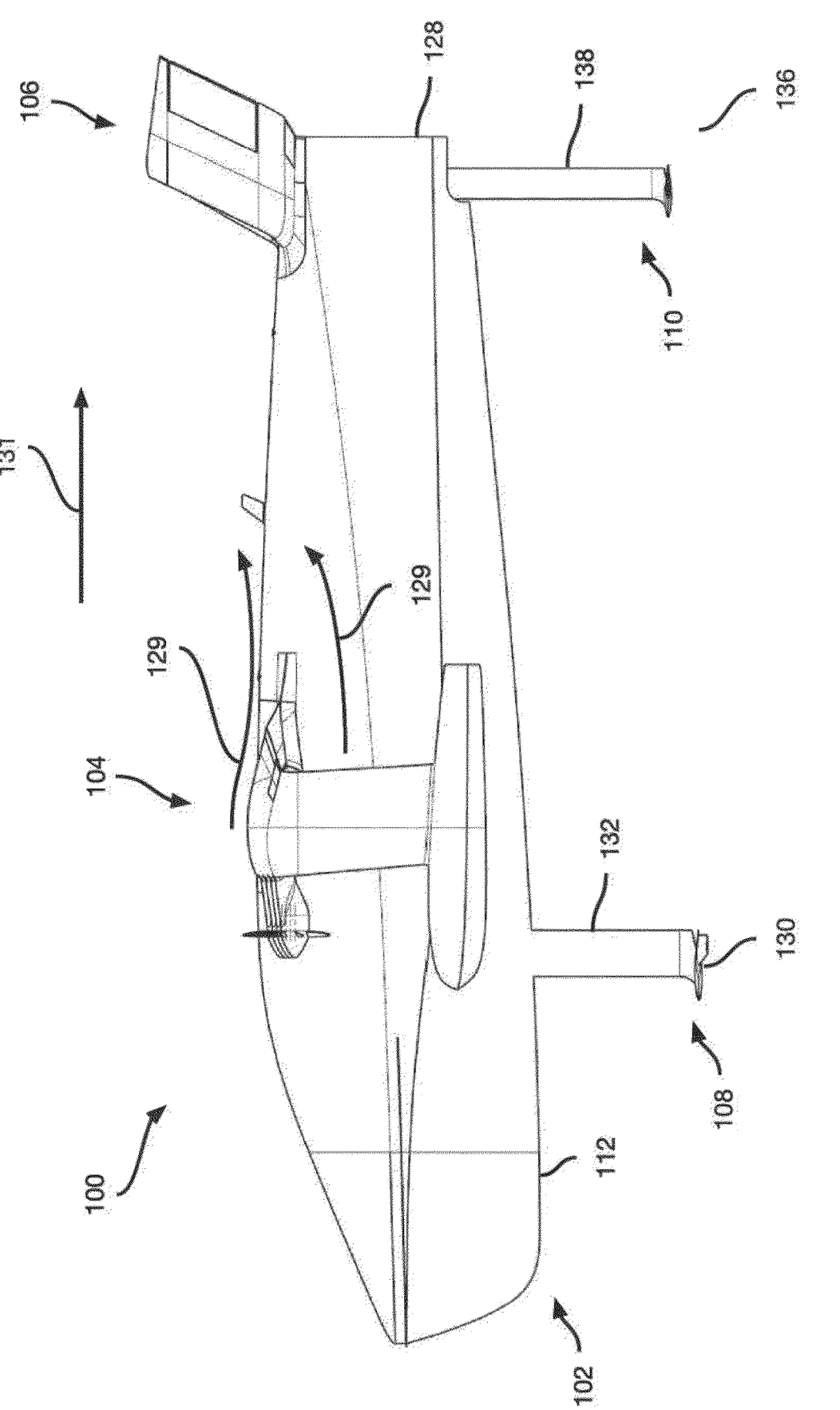

Various examples of systems, devices, and/or methods are described herein. Any embodiment, implementation, and/or feature described herein as being an "example" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, terms such as "A coupled to B" or "A is mechanically coupled to B" do not require members A and B to be directly coupled to one another. It is understood that various intermediate members may be utilized to "couple" members A and B together.

Moreover, terms such as "substantially" or "about" that may be used herein, are meant that the recited characteristic, parameter, or value need not be achieved exactly but that deviations or variations, including, for example, tolerances, measurement error, measurement accuracy limitations and other factors known to skill in the art, may occur in amounts that do not preclude the effect the characteristic was intended to provide.

I. Introduction

A craft can have a limited ability to bank given its proximity to a surface (e.g., the surface of a body of water in the case of a seaglider). Some of the following embodiments provide control surfaces on winglets of a craft to provide a side force to laterally move the craft with little or no banking required. With the side force being along or near the center of mass of the craft, the winglet control surfaces can laterally move the craft without inducing a yawing moment on the craft. Various winglet control surfaces are disclosed, and different articulation of the winglet control surfaces can cause different aeronautic effects on the craft.

In one embodiment, a craft is provided comprising: a body defining a longitudinal axis; and a wing comprising first and second winglets comprising respective winglet effectors positioned to cause a side force along a lateral axis when the winglet effectors are deployed in a same direction, wherein the lateral axis is perpendicular to the longitudinal axis and runs through a center of mass of the craft.

In another embodiment, a craft is provided comprising: a body; a wing; and port and starboard control surfaces positioned to cause a side force along a lateral axis running through a center of mass of the craft without creating a yawing moment on the craft when the port and starboard control surfaces are deployed in a same direction.

In another embodiment, a method is provided that is performed in a craft comprising control surfaces positioned to cause a side force along an axis running through a center of mass of the craft without creating a yawing moment on the craft. The method comprises determining a need to apply the side force along the axis; and actuating the control surfaces to apply the side force along the axis.

In another embodiment, a craft is provided comprising: a body; and a wing comprising first and second winglets comprising respective split-flap winglet effectors positioned to cause a braking force on the craft when all of the split-flaps of the split-flap winglet effectors are deployed.

In another embodiment, a craft is provided comprising: a body; a wing comprising ailerons; and first and second stand-alone ailerons coupled with the wing.

Other embodiments are disclosed, and the disclosed embodiments can be use alone or in combination.

These and other aspects are discussed in more detail in the passages that follow.

II. Example Wing-In-Ground Effect Vehicles

FIGS. 1A-1D illustrate different views of an example of a craft 100. As shown, some examples of the craft 100 include a hull 102, a main wing 104, a tail 106, a main hydrofoil assembly 108, and a rear hydrofoil assembly 110.

A. Hull

Some examples of the craft 100 operate in a first waterborne mode for an extended period of time, during which the hull 102 is at least partially submerged in water. As such, some examples of the hull 102 are configured to be watertight, particularly for surfaces of the hull that contact the water during this first waterborne operational mode. Further, some examples of the hull 102, as well as the entirety of the craft 100, are configured to be passively stable on all axes when floating in water. To help achieve this, some examples of the hull 102 include a keel (or centerline) 112, which provides improved stability and other benefits described below. Some examples of the craft 100 include various mechanisms for adjusting the center of mass of the craft 100 so that the center of mass aligns with the center of buoyancy of the craft 100. For instance, in some examples, a battery system (described in further detail below in connection with FIG. 4) of the craft 100 is electrically coupled to one or more moveable mounts. Some examples of the mounts are moved by one or more servo motors or the like. In some examples, a control system of the craft 100 is configured to detect a change in its center of buoyancy, for instance, by detecting a rotational change via an onboard gyroscope, and responsively operate the servo motors to move the battery system until the gyroscope indicates that the craft 100 has stabilized. Some examples of the craft 100 include a ballast system for pumping water or air to various tanks distributed throughout the hull 102 of the craft 100. The ballast system facilitates adjusting the center of mass of the craft 100 so that the center of mass aligns with the center of buoyancy of the craft 100. Other example systems may be used to control the center of mass of the craft 100 as well.

Additionally, or alternatively, some examples of the hull 102 are configured to reduce drag forces when both waterborne and wing-borne. For instance, some examples of the hull 102 have a high length-to-beam ratio (e.g., greater than or equal to 8), which facilitates reducing hydrodynamic drag forces when the craft 100 is under forward waterborne motion. Some examples of the keel 112 are curved or rockered to improve maneuverability when waterborne. Further, some examples of the hull 102 are configured to pierce the surface of waves (e.g., to increase passenger and crew comfort) by including a narrow, low-buoyancy bow portion of the hull 102.

B. Wing and Distributed Propulsion System

As shown in FIGS. 1A-1D, some examples of the main wing 104 include an outrigger 114 at each end of the main wing 104. The outriggers 114 (which are sometimes referred to as "wing-tip pontoons") are configured to provide a buoyant force to the main wing 104 when submerged or when otherwise in contact with the water, which improves the stability of the craft 100 during waterborne operation.

Figure 1D:
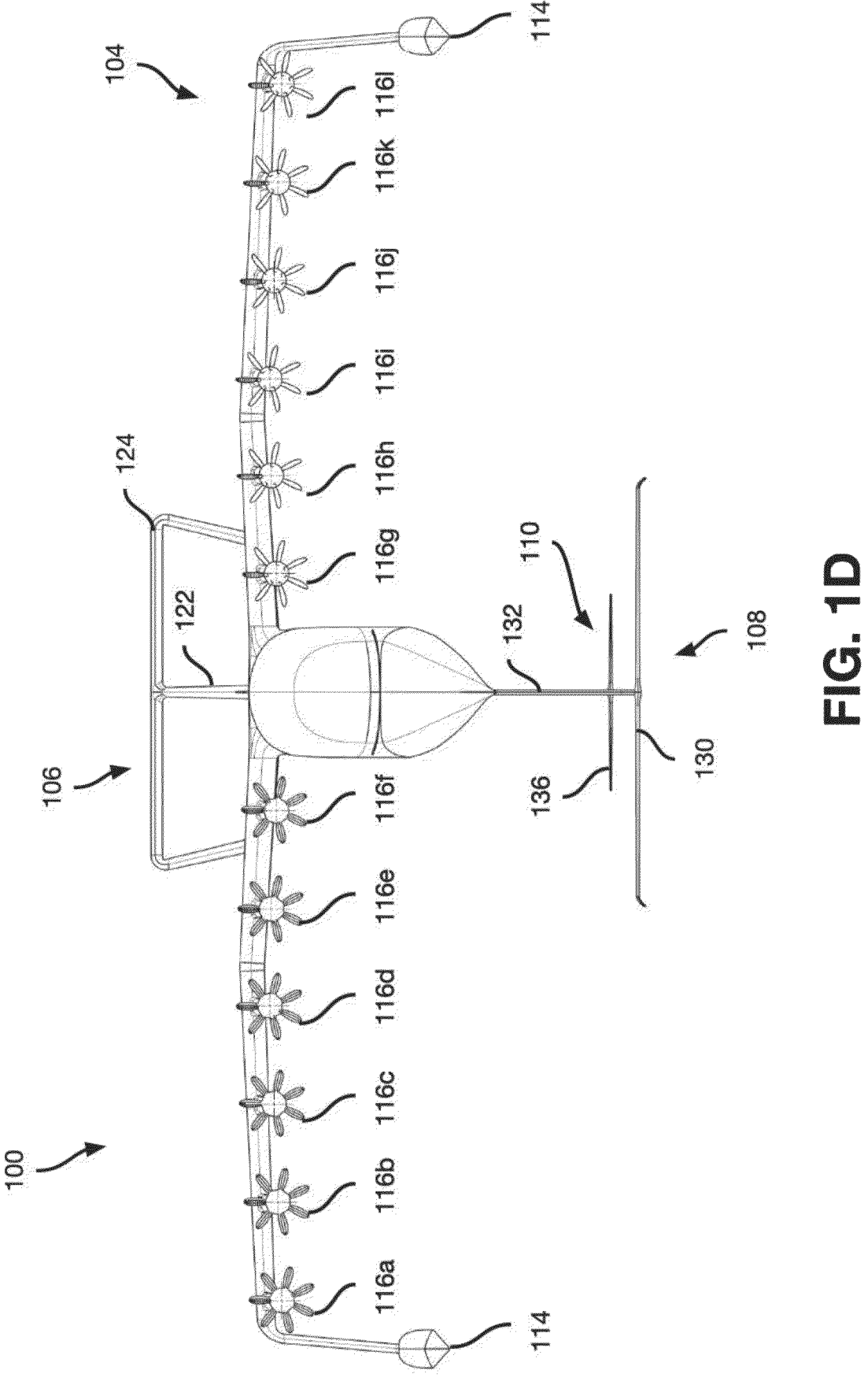

As shown in FIG. 1D, some examples of the main wing 104 have a gull-wing shape such that the outriggers 114 at the ends of the main wing 104 are at the lowest point of the main wing 104 and are positioned approximately level with (or slightly above) a waterline of the hull 102 when the hull 102 is waterborne.

Some examples of the main wing 104 have a high aspect ratio, which is defined as the ratio of the span of the main wing 104 to the mean chord of the main wing 104. In some examples, the aspect ratio of the main wing 104 is greater than or equal to five, or greater than or equal to six, but other example aspect ratios are possible as well. Such wings tend to have reduced pitch stability and maneuverability due to lower roll angular acceleration. These issues are ameliorated by various mechanisms described below. On the other hand, such wings tend to have increased roll stability and increased efficiency resulting from higher lift-to-drag ratios. Further, high aspect ratio wings provide a longer leading edge for the mounting of a distributed propulsion system along the wing.

As shown in the figures, some examples of the main wing 104 include a number of electric motor propeller assemblies 116 distributed across a leading edge of the main wing 104. This arrangement corresponds to a blown-wing propulsion system. Arranging the propeller assemblies 116 in this manner increases the speed of air moving over the main wing 104, which increases the lift generated by the main wing 104. This increase in lift allows the craft 100 to take off and become wing-borne at slower vehicle speeds. This facilitates, for example, taking off on water which can be difficult at higher speeds due to the various forces that would otherwise act on the craft 100.

The electric motor propeller assemblies 116 tend to be much lighter, less complex, and smaller than the liquid-fueled engines used on conventional craft. Some examples of the electric motor propeller assemblies 116 are controlled by an electronic speed controller and powered by an onboard battery system (e.g., a lithium-ion system, magnesium-ion system, lithium-sulfur system, etc.). Some examples of the electric motor propeller assemblies 116 are controlled by a fuel cell or a centralized liquid-fueled electricity generator. In some examples, the onboard electrical supply system includes multiple systems for supplying power during different operational modes, such as a first battery system configured to deliver large amounts of power during takeoff and a second system with a higher energy density but lower peak power capability for delivering sustained lower power during cruise operation (e.g., during hydrofoil waterborne operation or during wing-borne operation, each of which are described in further detail below).

In some examples, the positioning of the electric motor propeller assemblies 116 along the leading edge of the main wing 104 is determined based on a variety of factors including, but not limited to, (i) the required total thrust for all modes of operation of the craft 100, (ii) the thrust generated by each individual propeller of the propeller assemblies 116, (iii) the radius of each propeller in the respective propeller assemblies 116, (iv) the required tip clearance between each propeller and the surface of the water, and (v) the additional freestream speed over the main wing 104 required for operation.

As shown in the figures, in some examples, the number of propeller assemblies 116 is symmetrical across both sides of the hull 102. In some examples, the propeller assemblies 116 are identical. In some examples, the propeller assemblies 116 have different propeller radii or blade configurations along the span so long as the configuration is symmetrical across the hull 102. The different radii facilitate adequate propeller tip clearance from the water or vehicle structure. In some examples, the different propellers are optimized for different operational conditions, such as wing-borne cruise. The propeller placement and configuration may vary to increase the airflow over the main wing 104 or tail system 106 to improve controllability or stability. While eight total propeller assemblies 116 are illustrated, the actual number of propeller assemblies 116 can vary based on the requirements of the craft 100.

In some examples, the propeller assemblies 116 have different pitch settings or variable pitch capabilities based on their position on the main wing 104. For instance, in some examples, a subset of the propeller assemblies 116 have fixed-pitch propellers sized for cruise speeds, while the remainder of the propeller assemblies 116 have fixed-pitch propellers configured for takeoff or can allow for varying the propeller's pitch.

In some examples, different propeller assemblies 116 are turned off or have reduced rotational speeds during different modes of operation. For instance, during waterborne operation, one or more of the propeller assemblies 116 may be turned off or have reduced rotational speeds in a manner that generates asymmetrical thrust. This may create a yawing moment on the craft 100, allowing the craft 100 to turn without large bank angles and increasing the turning maneuverability of the craft 100. For instance, in order to yaw right, the craft 100 may increase the rotational speeds of the propellers of one or more of propeller assemblies 116g-1 while decreasing the rotational speeds of the propellers of one or more of propeller assemblies 116a-f. Similarly, to yaw left, the craft 100 may increase the rotational speeds of the propellers of one or more of propeller assemblies 116a-f while decreasing the rotational speeds of the propellers of one or more of propeller assemblies 116g-1.

Similarly varying rotational speeds or propeller pitches may be used to yaw or roll the aircraft in flight or while foiling due to varied forces and lift distributions imposed over the wing and its control surfaces or in general used to tailor the lift distribution across the wing for optimized efficiency.

In some examples, the propeller assemblies may tilt to vector thrust either to provide directly more vertical lift or to change how the wing is blown depending on the mode of operation so as to tailor the blown lift distribution.

Some examples of the main wing 104 include one or more aerodynamic control surfaces, such as flaps 118 and ailerons 120. Some examples of these controls comprise movable hinged surfaces on the trailing or leading edges of the main wing 104 for changing the aerodynamic shape of the main wing 104. Some examples of the flaps 118 are configured to extend downward below the main wing 104 to reduce stall speed and create additional lift at low airspeeds, while some examples of the ailerons 120 are configured to extend upward above the main wing 104 to decrease lift on one side of the main wing 104 and induce a roll moment in the craft

100. In some examples, the ailerons 120 are additionally configured to extend downward below the main wing 104 in a flaperon configuration to help the flaps 118 generate additional lift on the main wing 104, which, in some examples, is used to either create a rolling moment or additional balanced lift depending on coordinated movement of both ailerons. Some examples of the flaps 118 and ailerons 120 include one or more actuators for raising and lowering the flaps 118 and ailerons 120. Within examples, the flaps 118 include one or more of plain flaps, split flaps, slotted flaps, Fowler flaps, slotted Fowler flaps, Gouge flaps, Junkers flaps, or Zap flaps. Further, in some examples, the flaps 118 (and the ailerons 120 when configured as flaperons) are positioned to be in the wake of one or more of the propeller assemblies 116. In some examples, the ailerons 120 are positioned so that they are in the wake of one or more of the propeller assemblies 116 to increase the effectiveness of the ailerons at low forward velocities. Some of the propeller assemblies 116 are positioned so that no ailerons 120 are in their wake to increase thrust on the outboard wing during a turn without inducing adverse yaw. For example, in a left turn, a normal airplane would have adverse yaw to the right as the right aileron is deflected down, increasing drag. In the present disclosure, however, the right propeller assembly outboard of the right aileron may have its thrust increased relative to the respective left propeller assembly, initiating a turn without adverse yaw.

C. Tail System

As illustrated in FIGS. 1A-1D, some examples of the tail 106 include a vertical stabilizer 122, a horizontal stabilizer 124, and one or more control surfaces, such as elevators 126. Similar to the flaps 118 and ailerons 120, some examples of the elevators 126 comprise movable hinged surfaces on the trailing or leading edges of the horizontal stabilizer 124 for changing the aerodynamic shape of the horizontal stabilizer 124 to control a pitch of the craft 100. Some examples of the horizontal stabilizer 124 are combined with the elevator 126, creating a fully articulating horizontal stabilizer (e.g., a stabilator). Raising the elevators 126 above the hinge point creates a net downward force on the tail system and causes the craft 100 to pitch upward. Lowering the elevators 126 below the hinge point creates a net upward force on the horizontal stabilizer 124 and causes the craft 100 to pitch downward. Some examples of the elevators 126 include actuators, which are operated by a control system of the craft 100 to raise and lower the elevators 126.

As illustrated in FIGS. 1A-1D, some examples of tail 106 include a rudder 128. Some examples of the rudder 128 comprise a movable hinged surface on the trailing edge of the vertical stabilizer 122 for changing the aerodynamic shape of the vertical stabilizer 122 to control the yaw of the craft 100 when operating in an airborne mode. In some examples, the rudder 128 additionally changes a hydrodynamic shape of the hull 102 to control the yaw of the craft 100 when operating in a waterborne mode. To facilitate such hydrodynamic control, in some examples, the rudder 128 is positioned low enough on the tail 106 that the rudder 128 is partially or entirely submerged when the hull 102 is floating in water. For instance, the rudder 128 is positioned partially or entirely below the waterline of the hull 102. Some examples of the rudder 128 include one or more actuators, which are operated by a control system of the craft 100 to rotate the hinged surface of the rudder 128 to the left or right of the vertical stabilizer 122. Actuating the rudder 128 to the left (relative to the direction of travel) causes the craft 100 to yaw left. Actuating the rudder 128 to the right (relative to the direction of travel) causes the craft 100 to yaw right. As such, the rudder 128 may be used in combination with any of the other mechanisms disclosed herein for controlling the yaw of the craft 100, including in combination with the ailerons 120 during airborne operation and in combination with varying the rotational speeds of different ones of the propeller assemblies 116 to help improve the maneuverability of the craft 100 during waterborne operation.

Some examples of the tail 106 include one or more vertical stabilizers 122a, 122b, 122n, one or more horizontal stabilizers 124a, 124b, one or more control surfaces, such as elevators 126, and one or more tail flaps 127 for enhanced pitch control configured to exert enhanced net downward force on the tail system. It should be understood that although the figures show only two horizontal stabilizers, it is contemplated that more than two of each can be used within the scope of the present teachings. In some applications, it has been found that the transition from waterborne operation to airborne or wing-borne operation can require a larger pitching moment to overcome the larger drag forces existing between the hull 102 and/or the hydrofoil assemblies 108, 110 and the water. This phenomenon can further occur in wheeled aircraft configured for short takeoff and landing (STOL) operations. In this way, at low airspeeds, aerodynamic forces in conventional designs fail to produce sufficient downward force to permit sufficient pitching moment. To provide sufficient pitching moment to pitch the craft 100 upward, a conventional solution would be to increase the span of the tail so that the elevator generates more force; however, a resultant consequence of increasing the span of the tail is that the entire tail must be stronger and heavier, which can result in undesired reduction of payload and efficiency. However, the present configuration provides improved performance by providing a tail 106 having a first horizontal stabilizer 124a and a second horizontal stabilizer 124b. It should be understood that one or more additional horizontal stabilizers can be used.

In some examples, a first horizontal stabilizer 124a is a lower horizontal stabilizer relative to a second horizontal stabilizer 124b. However, it should be appreciated that the horizontal stabilizers in some examples can be interchanged for performance purposes (e.g., the disclosed structure of the first horizontal stabilizer 124a can be incorporated in the upper horizontal stabilizer and the disclosed structure of the second horizontal stabilizer 124b can be incorporated in the lower horizontal stabilizer). In some non-limiting examples, the structure, shape, and/or performance of each horizontal stabilizer can be tailored as desired such that the lower horizontal stabilizer (in this example, the first horizontal stabilizer 124a) is more likely to experience aerodynamic effect from being in the wake of the blown-wing propulsion system disclosed herein or associated wake produced by alternative propulsion systems. In this way, greater aerodynamic control and/or downwards lift can be generated during desired phases of operation.

Some examples of the horizontal stabilizers 124a, 124b include one or more aerodynamic control surfaces, such as tail flaps 127 and elevators 126, which may comprise movable hinged surfaces on the trailing or leading edges of the horizontal stabilizer 124a, 124b for changing the aerodynamic shape of the respective horizontal stabilizer 124a, 124b. It should be recognized that at least one of the horizontal stabilizers 124a, 124b can be sized, shaped, and/or spaced relative to a second of the horizontal stabilizers 124a, 124b to enhance or minimize the aerodynamic effect on the adjacent stabilizers. In this way, the aerodynamic flow, pressures, and/or forces can be used to improve the efficiency or effectiveness of the adjacent stabilizer. In some examples, at least one of the horizontal stabilizers 124a, 124b can be actuated in an opposing direction. In some embodiments, at least one of the horizontal stabilizers 124a, 124b can define a ratio of a surface area of the first horizontal stabilizer to a surface area of the second horizontal stabilizer in the range of 0.9 to 1.6. In some non-limiting example configurations, the surface area of the first horizontal stabilizer is 5.7 m2, the surface area of the second horizontal stabilizer is 3.9 m2, both have a chord of about 1 m and a vertical separation of 1.8 m. In some embodiments, a vertical separation distance between the first horizontal stabilizer and the second horizontal stabilizer is in the range of 0.25 to 0.75 of the lower horizontal stabilizer span. In some examples, a vertical separation distance can be dependent on the required rudder authority and thus elevator size (driven by, e.g., yaw stability, or the need to counteract asymmetric thrust following powerplant failure). In some examples, a sweep offset moves the center of pressure further aft from the center of gravity, thus allowing the airfoil of the horizontal stabilizer to have less surface area overall, thus being smaller and lighter. In some examples, a dihedral in the bottom surface of the horizontal stabilizer adds stability. In some examples, the box tail design itself increases the efficiency due to the elimination of wingtip vortices of a typical tail. In some embodiments, a lower horizontal stabilizer may have approximately a 15% thickness-to-chord ratio to support the weight of the upper components, whereas the vertical and upper surfaces may be thinner, such as, for example, 10% thickness-to-chord ratio due to reduced structural load requirement, which enables the upper horizontal stabilizer to be more efficient (lower drag). It should be appreciated that the left and right elevator surfaces 126 can be controlled independently and/or differentially to create a rolling moment, thereby enabling the wing ailerons 120 to be made smaller. The smaller wing ailerons 120 further enable larger flaps 118. It should be appreciated that in some embodiments, using the vertical control surfaces 128a, 128b, 128n can change the pressure distribution across the elevator 126, for example, commanding a left 5 degree deflection in the left vertical control surface may move the mean pressure distribution left/right by a percentage of the elevator width.

Some examples of the tail flaps 127 are configured to selectively extend upward above the horizontal stabilizer 124 for changing a surface area, camber, aspect ratio, and/or shape of the horizontal stabilizer 124. The tail flaps 127 may include, for example, one or more of plain flaps, split flaps, slotted flaps, Fowler flaps, slotted or double-slotted Fowler flaps, Gouge flaps, Junkers flaps, or Zap flaps. That is, in some examples, tail flaps 127 serve to change an angle of attack of the horizontal stabilizer 124, change a chord line of the horizontal stabilizer 124, change a surface area of the horizontal stabilizer 124, and/or otherwise increase the net effective downwardly directed lift of the horizontal stabilizer 124. Such configurations effectively reduce the speed at which the horizontal stabilizer 124 becomes aerodynamically effective by creating additional net downward force at low airspeeds to aid in exerting a nose-up pitching moment of the craft 100. The elevators 126 may be configured for changing the aerodynamic shape of the horizontal stabilizer 124 to further control or vary a pitch of the craft 100.

In some examples operations, the tail flaps 127 are deployed for takeoff (e.g., transition from hydrofoil-borne mode to airborne mode) and landing (e.g., transition from airborne mode to hull-borne mode) to generate additional downforce on the tail system when additional pitch-up moment is required. Tail flaps 127 can be stowed for other phases of operation, such as hull-borne mode, to reduce downforce on the tail system and reduce drag.

In some examples, the elevators 126 are additionally configured to extend upward above the horizontal stabilizer 124 in a flaperon-like configuration (yet with elevators, rather than ailerons) to help the tail flaps 127 generate additional downward force on the horizontal stabilizer 124, which may be used to either create a pitching moment or additional balanced downward force. The tail flaps 127 and elevators 126 may each include one or more actuators 125 for raising and lowering the tail flaps 127 and elevators 126, singly or in combination. The actuators 125 can comprise any system configured to selectively actuate the associated system, such as but not limited to a flap track system (integrated into vertical stabilizers 122a, 122b, 122n, which can reduce complex hinge systems or external arms, thereby reducing wetted area and excrescences drag), an electric servo motor mounting within the vertical stabilizers 122a, 122b, 122n and/or horizontal stabilizers 124a, 124b, and/or a central vertical strut system generally mounted in the hull 102 or the fuselage of the craft 100 (to provide the potential for reduced cross-sectional area and associated drag).

Further, in some examples, the elevators 126 and/or the tail flaps 127 are positioned so that they are in the wake 129 of one or more of the propeller assemblies 116 of main wing 104. The elevators 126 and/or the tail flaps 127 may be positioned so that they are in the wake 129 of one or more of the propeller assemblies 116 to increase the effectiveness of the elevators at low forward velocities. In some examples, the propeller assemblies 116 are positioned so that no elevators 126 and/or tail flaps 127 are in the wake 129 to ensure consistent and/or predictable aerodynamic forces, independent of power application, are exerted during critical operational phases. In some examples, the propeller assemblies 116 are positioned so that the elevators 126 are in their wake 129 and the tail flaps 127 are not in the wake 129 (e.g., above the wake 129) and are exposed to clean air 131. It should be understood that positioning of the tail flaps 127 in the second horizontal stabilizer 124b, or at a distance above the center of gravity of the craft 100, will have the added unexpected benefit of creating additional nose-up pitching moment as a result of induced drag acting about the center of gravity causing the craft 100 to pitch upward.

Similar to the flaps 118 and the ailerons 120 of the main wing 104, some examples of the elevators 126 comprise movable hinged surfaces on the trailing or leading edges of the horizontal stabilizer 124 for changing the aerodynamic shape of the horizontal stabilizer 124 to control a pitch of the craft 100. The horizontal stabilizer 124 may be combined with the elevator 126, creating a fully articulating horizontal stabilizer (e.g., a stabilator). Raising the elevators 126 above the hinge point creates a net downward force on the tail system and causes the craft 100 to pitch upward. Lowering the elevators 126 below the hinge point creates a net upward force on the horizontal stabilizer 124 and causes the craft 100 to pitch downward. The elevators 126 may include actuators, which may be operated by a control system of the craft 100 in order to raise and lower the elevators 126.

In some examples, the tail 106 includes one or more rudders 128a, 128b, 128n. The rudders 128a, 128b, 128n may each comprise a movable hinged surface on the trailing edge of the corresponding vertical stabilizers 122a, 122b, 122n for changing the aerodynamic shape of the vertical stabilizer 122 to control the yaw of the craft 100 when operating in an airborne mode. It should be understood that rudders 128a, 128b, 128n can operate independently or in combination as desired. Moreover, in some examples, rudders 128*a*, 128*b*, 128*n* can be used as redundant systems, particularly useful in the event of one or more failures.

In some examples, the rudders 128*a*, 128*b*, 128*n* additionally change a hydrodynamic shape of the hull 102 to control the yaw of the craft 100 when operating in a waterborne mode. In order to facilitate such hydrodynamic control, the rudders 128*a*, 128*b*, 128*n* may be positioned low enough on the tail 106 that one or more of the rudders 128*a*, 128*b*, 128*n* is partially or entirely submerged when the hull 102 is floating in water. Namely, the rudders 128*a*, 128*b*, 128*n* may be positioned partially or entirely below a waterline of the hull 102. The rudders 128*a*, 128*b*, 128*n* may include one or more actuators, which may be operated by a control system of the craft 100 in order to rotate the hinged surface of the rudders 128*a*, 128*b*, 128*n* to the left or right of the vertical stabilizer 122. Actuating the rudders 128*a*, 128*b*, 128*n* to the left (relative to the direction of travel) causes the craft 100 to yaw left. Actuating the rudders 128*a*, 128*b*, 128*n* to the right (relative to the direction of travel) causes the craft 100 to yaw right. As such, the rudders 128*a*, 128*b*, 128*n* may be used in combination with any of the other mechanisms disclosed herein for controlling the yaw of the craft 100, including in combination with the ailerons 120 during airborne operation and in combination with varying the rotational speeds of different ones of the propeller assemblies 116 to help improve the maneuverability of the craft 100 during waterborne operation.

It should be understood that the fundamental shape of tail 106, having one or more vertical stabilizers 122*a*, 122*b*, 122*n* and one or more horizontal stabilizers 124*a*, 124*b*, can result in a box-like assembly, wherein the vertical stabilizers are generally coupled to the horizontal stabilizers to form a reinforced box-like construction. This box-like construction provides enhanced structural integrity that enables tail 106 of some examples to be lighter and/or smaller than otherwise constructed.

Some examples of the craft 100 include a distributed propulsion system on the tail 106, which may be similar to the distributed propulsion system of propeller assemblies 116 on the main wing 104. Such a distributed propulsion system may provide similar benefits of increasing the freestream velocity over the control surfaces (e.g., the elevators 126 and/or the rudder 128) to allow for increased pitch and yaw control of the craft 100 at lower travel speeds. When determining the number and size of propeller assemblies to include on the tail 106, one may apply the same factors described above when determining the number and size of propeller assemblies to include on the main wing 104.

D. Hydrofoil Systems

As noted above, some examples of the craft 100 include a main hydrofoil assembly 108 and a rear hydrofoil assembly 110. In some examples, the main hydrofoil assembly 108 is positioned proximate to the middle or bow of the craft 100, and the rear hydrofoil assembly 110 is positioned proximate to the stern. For instance, some examples of the main hydrofoil assembly 108 is positioned between the bow and a midpoint (between the bow and stern) of the craft 100, and some examples of the rear hydrofoil assembly 110 is positioned below the tail 106 of the craft 100.

The main hydrofoil assembly 108 and the rear hydrofoil assembly 110 are configured to facilitate the breaking of contact between the hull of the craft and the water surface during takeoff, which, as noted above, can otherwise be challenging in some conventional craft designs. Some examples of the main hydrofoil assembly 108 and the rear hydrofoil assembly 110 are configured to be retractable, large enough to lift the entire craft out of the water and not impact the water surface, and to enable sustained operation in the hydrofoil-borne mode (where the entire weight of the craft is supported by the one or more hydrofoil assemblies).

Some examples of the main hydrofoil assembly 108 include a main hydrofoil 130, one or more main hydrofoil struts 132 that couple the main hydrofoil 130 to the hull 102, and one or more main hydrofoil control surfaces 134. Similarly, some examples of the rear hydrofoil assembly 110 include a rear hydrofoil 136, one or more rear hydrofoil struts 138 that couple the rear hydrofoil 136 to the hull 102, and one or more rear hydrofoil control surfaces 140.

Some examples of the main hydrofoil 130 and the rear hydrofoil 136 take the form of one or more hydrodynamic lifting surfaces (also referred to as "foils") configured to be operated partially or entirely submerged underwater while the hull 102 of the craft 100 remains above and clear of the water's surface. In operation, as the craft 100 moves through water with the main hydrofoil 130 and the rear hydrofoil 136 submerged, the hydrofoils generate a lifting force that causes the hull 102 to rise above the surface of the water. In general, the lifting force generated by the hydrofoils must be at least equal to the weight of the craft 100 to cause the hull 102 to rise above the surface of the water. The lifting force of the hydrofoils depends on the speed and angle of attack at which the hydrofoils move through the water, as well as their various physical dimensions, including the aspect ratio, the surface area, the span, and the chord of the foils.

The height at which the hull 102 is elevated above the surface of the water during hydrofoil-borne operation is limited by the length of the one or more main hydrofoil struts 132 that couple the main hydrofoil 130 to the hull 102 and the length of the one or more rear hydrofoil struts 138 that couple the rear hydrofoil 136 to the hull 102. In some examples, the main hydrofoil strut 132 and the rear hydrofoil strut 138 are long enough to lift the hull 102 at least five feet above the surface of the water during hydrofoil-borne operation, which facilitates operation in substantially choppy waters. Struts of other lengths may be used as well. For instance, in some examples, longer struts that allow for better wave-isolation of the hull 102 (but at the expense of the stability of the craft 100 and increasing complexity of the retraction system) are utilized.

In practice, hydrofoils have a limited top speed before cavitation occurs, which results in vapor bubbles forming and imploding on the surface of the hydrofoil. Cavitation not only may cause damage to a hydrofoil but also significantly reduces the amount of lift generated by the hydrofoil and increases drag. Therefore, it is desirable to reduce the onset of cavitation by designing the main hydrofoil 130 and the rear hydrofoil 136 in a way that allows the hydrofoils to operate at higher speeds (e.g., ~20-45 mph) and across the entire required hydrofoil-borne speed envelope before cavitation occurs. For instance, in some examples, the onset of cavitation is controlled based on the geometric design of the main hydrofoil 130 and the rear hydrofoil 136. Additionally, in some examples, the structural design of the main hydrofoil 130 and the rear hydrofoil 136 is configured to allow the surfaces of the hydrofoils to flex and twist at higher speeds, which may reduce loading on the hydrofoils and delay the onset of cavitation.

Further, in some examples, the distributed blown-wing propulsion system described above further facilitates the delay of onset of cavitation on the main hydrofoil 130 and the rear hydrofoil 136. Cavitation is caused by both (i) the amount of lift generated by a hydrofoil and (ii) the profile of the hydrofoil (which is affected by both the hydrofoil's angle of attack and its vertical thickness) as it moves through water. Reducing the amount of lift generated by the hydrofoil delays the onset of cavitation. Because the blown-wing propulsion system creates additional lift on the main wing 104, the amount of lift exerted on the main hydrofoil 130 and the rear hydrofoil 136 to lift the hull 102 out of the water is reduced. Further, because the main hydrofoil 130 and the rear hydrofoil 136 do not need to generate as much lift to raise the hull 102 out of the water, their angles of attack may be reduced as well, which further delays the onset of cavitation. In some examples, combining the blown-wing propulsion system with the hydrofoil designs described herein facilitates operating the craft 100 in a hydrofoil-borne mode at speeds above 35 knots before cavitation occurs.

As noted above, some examples of the main hydrofoil assembly 108 and the rear hydrofoil assembly 110 include one or more main and rear hydrofoil control surfaces 134, 140, respectively. Some examples of the main hydrofoil control surfaces 134 include one or more hinged surfaces on a trailing or leading edge of the main hydrofoil 130 as well as one or more actuators which are operated by the control system of the craft 100 to rotate the hinged surfaces so that they extend above or below the main hydrofoil 130. Some examples of the main hydrofoil control surfaces 134 on the main hydrofoil 130 are operated in a similar manner as the flaps 118 and ailerons 120 on the main wing 104 of the craft 100. In some examples, lowering the control surfaces 134 to extend below the main hydrofoil 130 changes the hydrodynamic shape of the main hydrofoil 130 in a manner that generates additional lift on the main hydrofoil 130, similar to the aerodynamic effect of lowering the flaps 118. In some examples, asymmetrically raising one or more of the control surfaces 134 (e.g., raising a control surface 134 on only one side of the main hydrofoil 130) changes the hydrodynamic shape of the main hydrofoil 130 in a manner that generates a roll force on the main hydrofoil 130, similar to the aerodynamic effect of raising one of the ailerons 120.

Likewise, some examples of the rear hydrofoil control surfaces 140 include one or more hinged surfaces on a trailing or leading edge of the rear hydrofoil 136 as well as one or more actuators, which are operated by the control system of the craft 100 to rotate the hinged surfaces so that they extend above or below the rear hydrofoil 136. In some examples, the rear hydrofoil control surfaces 140 on the rear hydrofoil 136 are operated in a similar manner as the elevators 126 on the tail 106 of the craft 100. In some examples, lowering the control surfaces 140 to extend below the rear hydrofoil 136 changes the hydrodynamic shape of the rear hydrofoil 136 in a manner that causes the craft 100 to pitch downwards, similar to the aerodynamic effect of lowering the elevators 126. In some examples, raising the control surfaces 140 to extend above the rear hydrofoil 136 changes a hydrodynamic shape of the rear hydrofoil 136 in a manner that causes the craft 100 to pitch upwards, similar to the aerodynamic effect of raising the elevators 126.

In some examples, one or both of the main hydrofoil control surfaces 134 or the rear hydrofoil control surfaces 140 include rudder-like control surfaces similar to the rudder 128 on the tail 106 of the craft 100. For instance, some examples of the main hydrofoil control surfaces 134 include one or more hinged surfaces on a trailing edge of the main hydrofoil strut 132 as well as one or more actuators, which are operated by the control system of the craft 100 to rotate the hinged surfaces so that they extend to the left or right of the main hydrofoil strut 132. Similarly, some examples of the rear hydrofoil control surfaces 140 include one or more hinged surfaces on a trailing edge of the rear hydrofoil strut 138 as well as one or more actuators, which are operated by the control system of the craft 100 in order to rotate the hinged surfaces so that they extend to the left or right of the rear hydrofoil strut 138. In some examples, actuating the main hydrofoil control surfaces 134 or the rear hydrofoil control surfaces 140 in this manner changes the hydrodynamic shape of the main hydrofoil strut 132 or the rear hydrofoil strut 138, respectively, which facilitates controlling the yaw of the craft 100 when operating in a waterborne or hydrofoil-borne mode, similar to the effect of actuating the rudder 128 of the craft 100, as described above.

In some examples, instead of (or in addition to) actuating hinged control surfaces on the main hydrofoil 130 and/or the rear hydrofoil 136, a control system of the craft 100 actuates the entire main hydrofoil 130 and/or the entire rear hydrofoil 136 themselves. In some examples, the craft 100 includes one or more actuators for rotating the main hydrofoil 130 and/or the rear hydrofoil 136 around the yaw axis. In some examples, the craft 100 includes one or more actuators for controlling the angle of attack of the main hydrofoil 130 and/or the rear hydrofoil 136 (i.e., rotating the main hydrofoil 130 and/or the rear hydrofoil 136 around the pitch axis). Some examples of the craft 100 include one or more actuators for rotating the main hydrofoil 130 and/or the rear hydrofoil 136 around the roll axis. Some examples of the craft 100 include one or more actuators for changing a camber or shape of the main hydrofoil 130 and/or the rear hydrofoil 136. Some examples of the craft 100 include one or more actuators for flapping the main hydrofoil 130 and/or the rear hydrofoil 136 to help propel the craft 100 forward or backward. Other examples are possible as well.

Further, some examples of the craft 100 dynamically control an extent to which the main hydrofoil 130 and/or the rear hydrofoil 136 are deployed based on an operational mode (e.g., hull-borne, hydrofoil-borne, or wing-borne modes) of the craft 100. For instance, in some examples, during hull-borne mode, the rear hydrofoil assembly 110 is partially deployed or retracted to increase turning authority. The amount of partial deployment or retraction may be a function of the desired overall vehicle draft when operating in a shallow water environment. In some examples, during hydrofoil-borne mode, the main hydrofoil assembly 108 is partially retracted to reduce the distance between the hull of the vehicle and the water's surface. This increases the amount of lift generated by the main wing 104 by operating the wing closer to the surface of the water, increasing the effects of the aerodynamic ground effect.

As noted above, some examples of the main hydrofoil assembly 108 and rear hydrofoil assembly 110 interface with a deployment system that facilitates retracting the respective hydrofoil assemblies 108, 110 into or toward the hull 102 for hull-borne or wing-borne operation and for extending the respective hydrofoil assemblies 108, 110 below the hull 102 for hydrofoil-borne operation. As described further below, in some embodiments, the deployment system is used in connection with extending, retracting, and/or otherwise controlling the positioning of the hydrofoil assemblies 108, 110 during takeoff when the craft is transitioning from hydrofoil-borne operation to wing-borne operation.

E. Hydrofoil Deployment Systems

Figure 2:
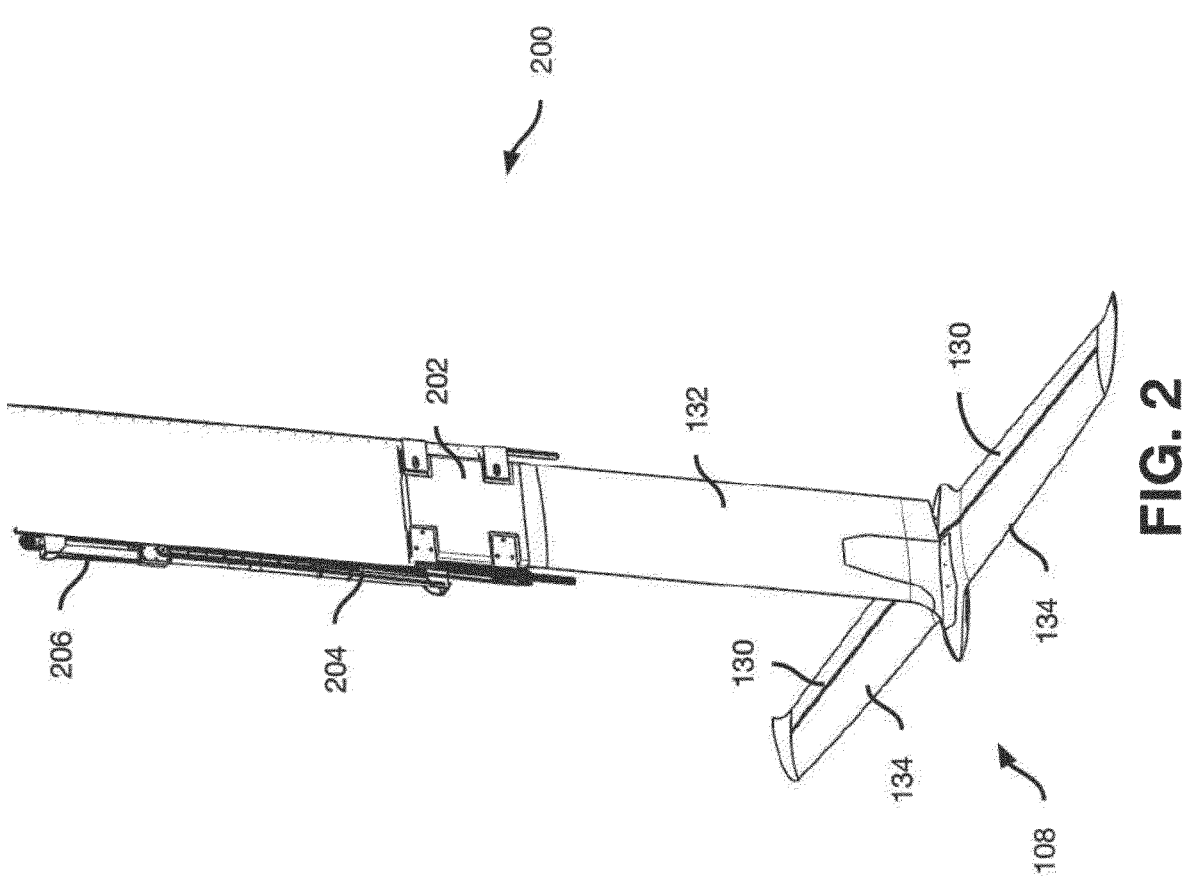
FIG. 2 is an illustration of a main hydrofoil deployment system of a craft of an embodiment.

FIG. 2 illustrates an example of a main hydrofoil deployment system 200 that facilitates retracting and extending of the main hydrofoil assembly 108. As shown, some examples of the main hydrofoil deployment system 200 take the form of a linear actuator that includes one or more brackets 202 that couple the main hydrofoil assembly 108 (by way of the main hydrofoil strut 132) to one or more vertical tracks 204.

Some examples of the brackets 202 are configured to move vertically along the tracks 204, such that when the brackets 202 move vertically along the tracks 204, the main hydrofoil assembly 108 likewise moves vertically. Some examples of the brackets 202 are coupled to a leadscrew 206 that, when rotated, causes vertical movement of the brackets 202. Some examples of the leadscrew 206 are rotatable by any of various sources of torque, such as an electric motor coupled to the leadscrew 206 by a gear assembly 208.

Some examples of the main hydrofoil deployment system 200 further include one or more sensors 210 configured to detect a vertical position of the main hydrofoil assembly 108. For example, a first sensor senses when the main hydrofoil assembly 108 has reached a fully retracted position and a second sensor senses when the main hydrofoil assembly 108 has reached a fully extended position. However, the main hydrofoil deployment system 200 may include additional sensors for detecting additional discrete positions or continuous positions of the main hydrofoil assembly 108. Some examples of the sensors are included as part of, or otherwise configured to communicate with, the control system of the craft 100 to provide the control system with data that indicates the position of the main hydrofoil assembly 108. Some examples of the control system use this data to determine whether to operate the electric motor to retract or extend the main hydrofoil assembly 108.

In some examples, such as examples where the linear actuator is not a self-locking linear actuator, the main hydrofoil deployment system 200 includes a locking or braking mechanism for holding the main hydrofoil strut 132 in a fixed position (e.g., in a fully retracted or fully extended position). An example of the locking mechanism corresponded to a dual-action mechanical brake that is coupled to the electric motor, the leadscrew 206, or the gear assembly.

While the above description provides various details of an example main hydrofoil deployment system 200, it should be understood that the main hydrofoil deployment system 200 illustrated in FIG. 2 is for illustrative purposes and is not meant to be limiting. For instance, the main hydrofoil deployment system 200 may include any of various linear actuators now known or later developed that are capable of retracting and extending the main hydrofoil assembly 108.

Figure 3:
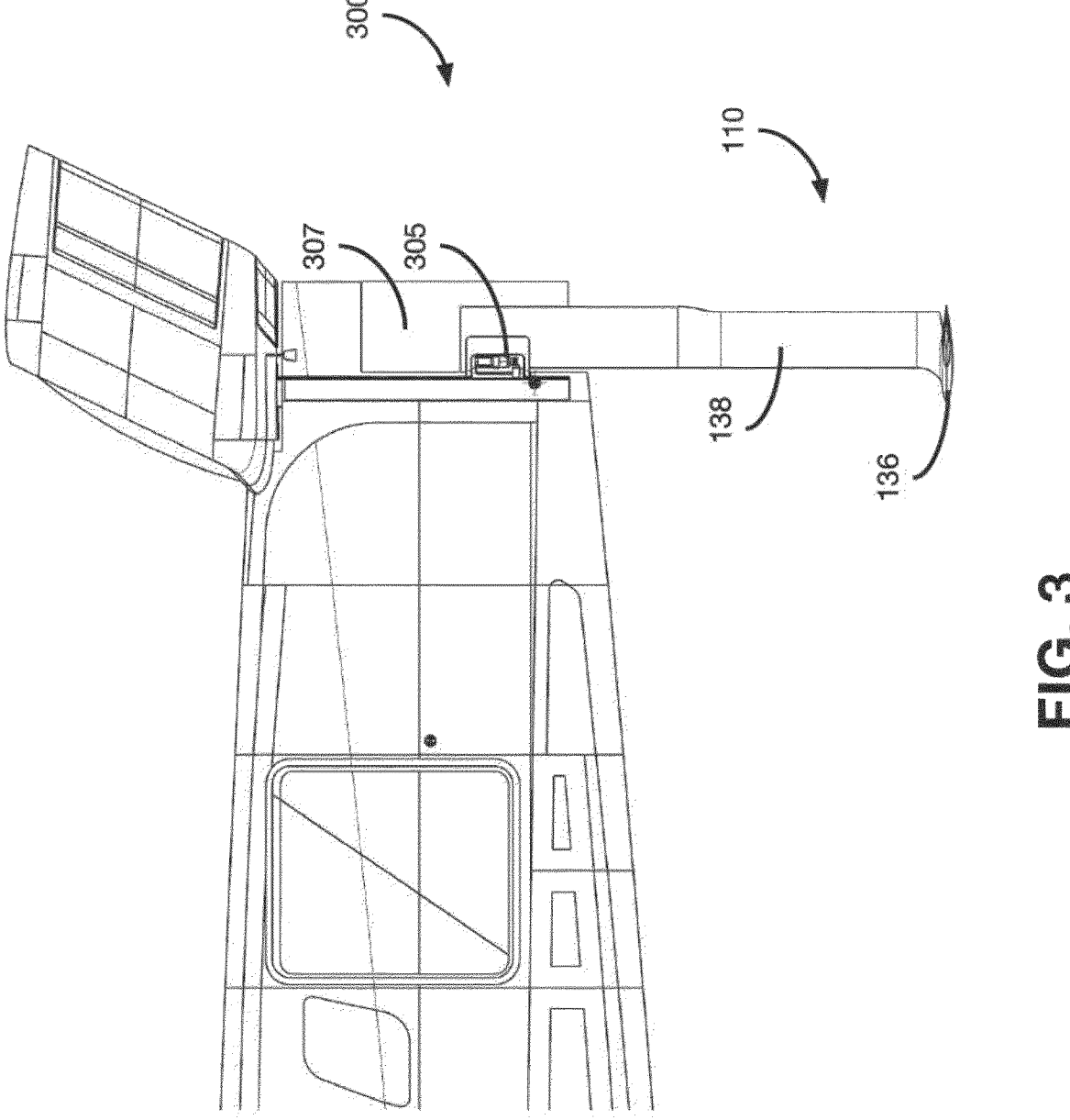
FIG. 3 is an illustration of a rear hydrofoil deployment system of a craft of an embodiment.

FIG. 3 illustrates an example of a rear hydrofoil deployment system 300 that facilitates retracting and extending the rear hydrofoil 136. As shown, some examples of the rear hydrofoil deployment system 300 include an actuator 305 to the rear hydrofoil strut 138. When actuated, the actuator 305 causes the rear hydrofoil strut 138 to raise or lower by causing the rear hydrofoil strut 138 to slide vertically along a shaft 307. While not illustrated in FIG. 3, in some examples, the rudder 128 is mounted to the shaft 307 such that, when the actuator 305 raises the rear hydrofoil strut 138, the rear hydrofoil strut 138 retracts at least partially into the rudder 128. Additionally, some examples of the rear hydrofoil deployment system 300 include one or more servo motors configured to rotate the rear hydrofoil strut 138 around the shaft. In this respect, in some examples, the rear hydrofoil strut 138 is rotated around the shaft to act as a hydro-rudder when submerged in water or to act as an aero-rudder when out of the water. Further, because the rudder 128 is mounted to the same shaft 307 as the rear hydrofoil strut 138 and the rear hydrofoil strut 138 can be retracted into the rudder 128, the same servo motor can also be used to control the rotation of the rudder 128.

The actuator 305 of the rear hydrofoil deployment system 300 may take various forms and may, for instance, include any of various linear actuators now known or later developed that are capable of retracting and extending the rear hydrofoil assembly 110. Further, in some examples, the actuator 305 has a non-unitary actuation ratio such that a given movement of the actuator 305 causes a larger corresponding induced movement of the rear hydrofoil assembly 110. This can help allow for faster retractions of the rear hydrofoil assembly 110, which may be beneficial during takeoff, as described in further detail below.

Some examples of the main hydrofoil assembly 108 and/or the rear hydrofoil assembly 110 are configured such that, when fully retracted, the hydrofoil assembly is flush, conformal, or tangent to the hull 102. For instance, some examples of the hull 102 include one or more recesses configured to receive the main hydrofoil assembly 108 and/or the rear hydrofoil assembly 110. In this regard, some examples of the main hydrofoil assembly 108 and/or the rear hydrofoil assembly 110 have a shape such that when the main hydrofoil assembly 108 and/or the rear hydrofoil assembly 110 are fully retracted into the recesses of the hull 102, the outer contour of the hull 102 forms a substantially smooth transition at the intersection of the hull 102 and the main hydrofoil assembly 108 and/or the rear hydrofoil assembly 110.

Other examples of the main hydrofoil assembly 108 and/or the rear hydrofoil protrude slightly below the hull 102 when retracted. These examples of the main hydrofoil assembly 108 and/or the rear hydrofoil assembly 110 are configured to have a non-negligible effect on the aerodynamics of the craft 100. Some examples of the craft 100 are configured to leverage these effects to provide additional control of the craft 100. For instance, in some examples, when the main hydrofoil assembly 108 and/or the rear hydrofoil assembly 110 are retracted but still exposed, the exposed hydrofoil is manipulated in flight to impart forces and moments on the craft 100 similar to an aero-control surface.

Some examples of the hydrofoil assemblies 108, 110 disclosed herein are mounted on a pivot that is locked underwater but is unlocked to allow the hydrofoil to move around the pivot in the air. At that point, the control surfaces act like trim tabs and are able to effect movement of the entire unlocked, pivoting hydrofoil, which would otherwise require impractically large and heavy servo motors. This configuration facilitates unlocking and moving of the hydrofoil using a slow servo and/or a combination of control surface movement combined with forward movement through water, and then re-locked such that the hydrofoil is at a selected angle of incidence.

As noted above, some examples of the main hydrofoil assembly 108 are configured to be retractable. Some examples of the hull 102 include openings through which the strut 132 of the main hydrofoil assembly 108 are retracted and extended. Some examples of the hull 102 are configured to isolate water that enters through these openings (e.g., when the hull 102 contacts the water surface) and to allow for the water to drain from the hull 102 after the hull 102 is lifted out of the water. For instance, some examples of the hull 102 include pockets 142 on each side of the hull 102 aligned above the strut 132. Some examples of the pockets 142 are isolated from the remainder of the interior of the hull 102 so that water that accumulates in the pockets 142 does not reach any undesired areas (e.g., the cockpit, passenger seating area, areas that house the battery system 400, components of the control system of the craft 100, etc.). Further, some examples of the pockets 142 include venting holes or other openings located at or near the bottom of the pockets 142. The venting openings are configured to allow water that enters the pockets 142 to vent out of the pockets 142 when the hull 102 is lifted out of the water.

Some examples of the main hydrofoil assembly 108 and/or the rear hydrofoil assembly 110 include one or more propellers for additional propulsion when submerged underwater. For instance, in some examples, one or more propellers are mounted to the main hydrofoil 130 and/or the rear hydrofoil 136. In some examples, the propellers are configured to provide additional propulsion force to the craft 100 during hydrofoil-borne or hull-borne operation.

In some examples, propellers are mounted to the hull 102. The propellers are submerged during hull-borne operation. In some examples, the propellers are configured to provide additional propulsion force to the craft 100 during hull-borne operation.

Some examples of the main and/or rear hydrofoil assemblies 108, 110 include various failsafe mechanisms in case of malfunction. For instance, in some examples, when one or both of the main and rear hydrofoil deployment systems 200, 300 cannot be retracted due to a malfunction, the craft 100 is configured to jettison the malfunctioning assembly. In this regard, some examples of the main and/or rear hydrofoil assemblies 108, 110 are coupled to the hull 102 by a releasable latch. Some examples of the control system of the craft 100 are configured to identify a retraction malfunction (e.g., based on data received from the positional sensors 210) and responsively open the latch to release the connection between the hull 102 and the malfunctioning hydrofoil assembly. In some examples, the weight of the malfunctioning hydrofoil assembly is sufficient to jettison the malfunctioning hydrofoil assembly out of the hull 102 when the latch is opened. Some examples of the craft 100 include an actuator or some other mechanism to jettison the malfunctioning hydrofoil assembly out of the hull 102. In some examples, the main and/or rear hydrofoil assemblies 108, 110 are configured to break in a controlled manner upon impact with water. For instance, in some examples, a joint between the main hydrofoil strut 132 and the hull 102 and/or a joint between the rear hydrofoil strut 138 and the hull 102 is configured to disconnect when subjected to a torque significantly larger than standard operational torques at the joints. Other designs for providing controlled breaks are possible as well.

F. Battery System

Figure 4:
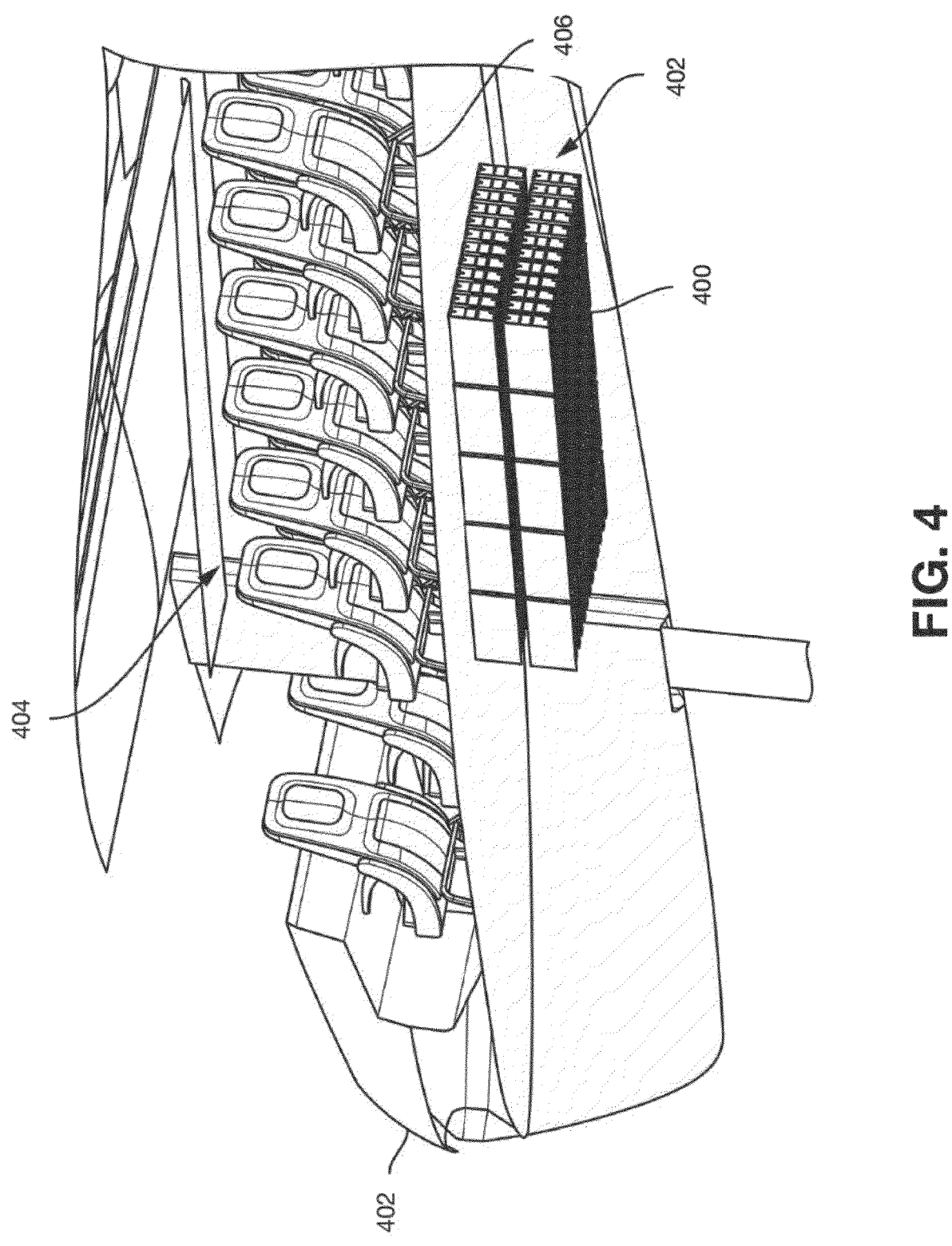
FIG. 4 is an illustration of a battery system of a craft of an embodiment.

FIG. 4 illustrates an example of an onboard battery system. In some examples, the battery system 400 is arranged in a protected area 402 of the hull 102 below a passenger seating area 404. Some examples of the battery system 400 are separated from the passenger seating area 404 by a firewall 406 to protect the passengers from harm if a thermal runaway occurs. In this regard, some examples of the craft 100 include a battery management system comprising voltage, current, and/or thermal sensors for detecting thermal runaway or some other fire detection system for detecting a fire in the protected area 402.

Some examples of the craft 100 include one or more mechanisms for flooding the battery system 400 (e.g., with an inert gas fire, with water, etc.) upon detecting a thermal runaway or a fire in the protected area 402. For instance, some examples of the hull 102 comprise one or more valves or other controllable openings. The control system of the craft 100 is configured to open the valves and/or controllable openings upon detecting a fire in the protected area 402 or thermal runaway in the battery system 400 to allow water to enter the protected area 402 and to extinguish or prevent a fire in the protected area 402.

In some examples, the battery system 400 is configured to be jettisoned through one or more of the controllable openings in the hull 102 described above. In this regard, in some examples, the weight of the battery system 400 is sufficient to jettison the battery system 400 out of the hull 102 when the hull 102 is opened. In some examples, the craft 100 comprises an actuator or the like configured to jettison the battery system 400 out of the hull 102.

In other examples, the craft 100 may take measures to become waterborne in response to detecting a fire in the protected area 402 or thermal runaway in the battery system 400. Some examples of the control system of the craft 100 determine a fire suppression operation to perform based on the operational state of the craft 100 (e.g., operating in hull-borne, hydrofoil-borne, or wing-borne mode). For instance, when operating in hull-borne mode and upon detecting a thermal runaway or a fire in the protected area 402, some examples of the control system are configured to flood the battery system 400 as described above. When operating in hydrofoil-borne or a wing-borne mode, the control system is configured to cause the craft 100 to transition to hull-borne mode upon detecting a thermal runaway or a fire in the protected area 402 and then flood the battery system 400.

G. Control System

Figure 5:
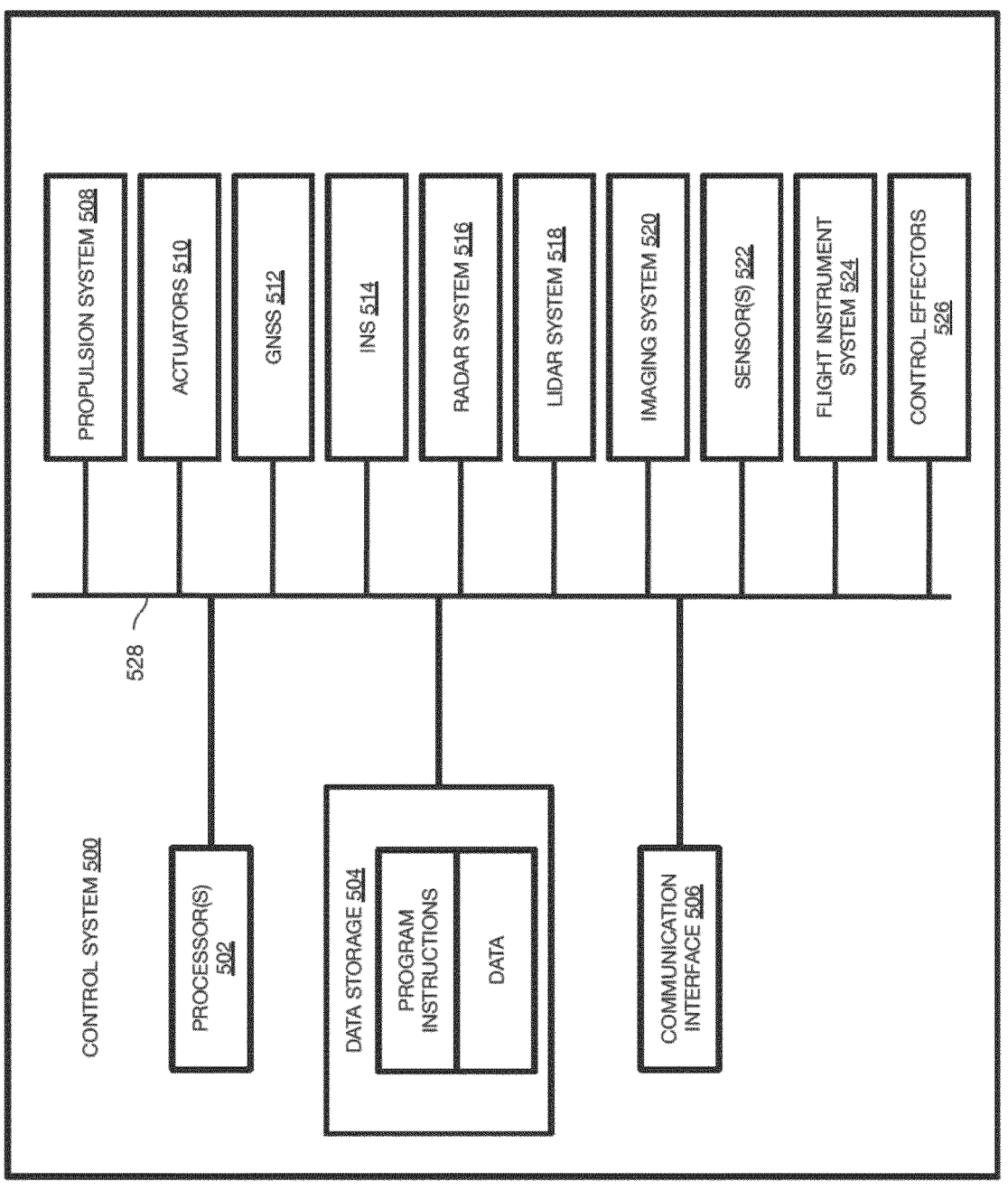
FIG. 5 is an illustration of a control system of a craft of an embodiment.

FIG. 5 illustrates an example of a control system 500 of the craft 100. As shown, some examples of control system 500 include one or more processors 502, data storage 504, a communication interface 506, a propulsion system 508, actuators 510, a Global Navigation Satellite System (GNSS) 512, an inertial navigation system (INS) 514, a radar system 516, a lidar system 518, an imaging system 520, various sensors 522, a flight instrument system 524, and flight controls 526. In some examples, some or all of these components communicate with one another via one or more communication links 528 (e.g., a system bus, a public, private, or hybrid cloud communication network, etc.)

Some examples of processors 502 correspond to or comprise general-purpose processors (e.g., a single- or multi-core microprocessor), special-purpose processors (e.g., an application-specific integrated circuit or digital-signal processor), programmable logic devices (e.g., a field-programmable gate array), controllers (e.g., microcontrollers), and/or any other processor components now known or later developed. Further, while the one or more processors 502 are illustrated as a separate stand-alone component of the control system 500, it should also be understood that the one or more processors 502 could comprise processing components that are distributed across one or more of the other components of the control system 500.

Some examples of the data storage 504 comprise one or more non-transitory computer-readable storage mediums that are collectively configured to store (i) program instructions executable by the one or more processors 502 such that the control system 500 is configured to perform some or all of the functions disclosed herein, and (ii) data that may be received, derived, or otherwise stored, for example, in one or more databases, file systems, or the like, by the control system 500 in connection with the functions disclosed herein. In this respect, the one or more non-transitory computer-readable storage mediums of data storage 504 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. Further, while the data storage 504 is illustrated as a separate stand-alone component of the control system 500, it should also be understood that the data storage 504 may comprise computer-readable storage mediums that are distributed across one or more of the other components of the control system 500.

Some examples of the communication interface 506 include one or more wireless interfaces and/or one or more wireline interfaces, which allow the control system 500 to communicate via one or more networks. Some example wireless interfaces provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Some example wireline interfaces include an Ethernet interface, a Universal Serial Bus (USB) interface, CAN Bus, RS-485, or similar interface to communicate via a wire, a twisted pair of wires, a coaxial cable, an optical link, a fiber-optic link, or other physical connection to a wireline network.

Some examples of the propulsion system 508 include one or more electronic speed controllers (ESCs) for controlling the electric motor propeller assemblies 116 distributed across the main wing 104 and, in some examples, across the horizontal stabilizer 124. Some examples of the propulsion system 508 include a separate ESC for each respective propeller assembly 116, such that the control system 500 individually controls the rotational speeds of the electric motor propeller assemblies 116.

Some examples of the actuators 510 include any of the actuators described herein, including (i) actuators for raising and lowering the flaps 118, ailerons 120, elevators 126, main hydrofoil control surfaces 134, and rear hydrofoil control surfaces 140, (ii) actuators for turning the rudder 128, the main hydrofoil control surfaces 134 positioned on the main hydrofoil strut 132, and the rear hydrofoil control surfaces 140 positioned on the rear hydrofoil strut 138, (iii) actuators for retracting and extending the main hydrofoil assembly 108 and the rear hydrofoil assembly 110, and/or (iv) actuators for performing the various other disclosed actuations of the main hydrofoil assembly 108 and the rear hydrofoil assembly 110. Each of the actuators described herein may include any actuators now known or later developed capable of performing the disclosed actuation. Some examples of the actuators correspond to linear actuators, rotary actuators, hydraulic actuators, pneumatic actuators, electric actuators, electro-hydraulic actuators, and mechanical actuators. Some examples of the actuators correspond to electric motors, stepper motors, and hydraulic cylinders. Other examples are contemplated herein as well.

Some examples of the GNSS system 512 are configured to provide a measurement of the location, speed, altitude, and heading of the craft 100. The GNSS system 512 includes one or more radio antennas paired with signal processing equipment. Data from the GNSS system 512 may allow the control system 500 to estimate the position and speed of the craft 100 in a global reference frame, which can be used for route planning, operational envelope protection, and vehicle traffic deconfliction by both understanding where the craft 100 is located and comparing the location with known traffic.

Some examples of the INS 514 include motion sensors, such as angular and/or linear accelerometers, and rotational sensors, such as gyroscopes, to calculate the position, orientation, and speed of the craft 100 using dead reckoning techniques. In some examples, one or more of these components are used by the control system to calculate actuator outputs to stabilize or otherwise control the vehicle during all modes of operation.

Some examples of the radar system 516 include a transmitter and a receiver. The transmitter may transmit radio waves via a transmitting antenna. The radio waves reflect off an object and return to the receiver. The receiver receives the reflected radio waves via a receiving antenna, which may be the same antenna as the transmitting antenna, and the radar system 516 processes the received radio waves to determine information about the object's location and speed relative to the craft 100. This radar system 516 may be utilized to detect, for example, the water surface, maritime or wing-borne vehicle traffic, wildlife, or weather.

Some examples of the lidar system 518 comprise a light source and an optical receiver. The light source emits a laser that reflects off an object and returns to the optical receiver. The lidar system 518 measures the time for the reflected light to return to the receiver to determine the distance between the craft 100 and the object. This lidar system 518 may be utilized by the flight control system to measure the distance from the craft 100 to the surface of the water in various spatial measurements.

Some examples of the imaging system 520 include one or more still and/or video cameras configured to capture image data from the environment of the craft 100. Some examples of the cameras correspond to or comprise charge-coupled device (CCD) cameras, complementary metal-oxide-semiconductor (CMOS) cameras, short-wave infrared (SWIR) cameras, mid-wave infrared (MWIR) cameras, or long-wave infrared (LWIR) cameras. Some examples of the imaging system 520 are configured to perform obstacle avoidance, localization techniques, water surface tracking for more accurate navigation (e.g., by applying optical flow techniques to images), video feedback, and/or image recognition and processing among other possibilities.

As noted above, some examples of the control system 500 include various other sensors 522 for use in controlling the craft 100. Examples of such sensors 522 correspond to or comprise thermal sensors or other fire detection sensors for detecting a fire in the hull 102 or for detecting thermal runaway in the battery system 400. As further described above, the sensors 522 may include position sensors for sensing the position of the main hydrofoil assembly 108 and/or the rear hydrofoil assembly 110 (e.g., sensing whether the assemblies are in a retracted or extended position). Examples of position sensors may include photodiode sensors, capacitive displacement sensors, eddy-current sensors, Hall effect sensors, inductive sensors, or any other position sensors now known or later developed.

Some examples of the sensors 522 facilitate determining the altitude of the craft 100. For instance, some examples of the sensor 522 include an ultrasonic altimeter configured to emit and receive ultrasonic waves. The emitted ultrasonic waves reflect off the water surface below the craft 100 and return to the altimeter. The ultrasonic altimeter measures the time for the reflected ultrasonic wave to return to the altimeter to determine the distance between the craft 100 and the water surface. Some examples of the sensor 522 include a barometer for use as a pressure altimeter. The barometer measures the atmospheric pressure in the environment of the craft 100 and determines the altitude of the craft 100 based on the measured pressure. Some examples of the sensor 522 include a radar altimeter to emit and receive radio waves. The radar altimeter measures the time for the radio wave to reflect off of the surface of the water below the craft 100 to determine a distance between the craft 100 and the water surface. In some examples, these sensors are placed in different locations on the craft 100 to reduce the impact of sensor constraints, such as sensor deadband or sensitivity to splashing water.

Some examples of the control system 500 are configured to use one or more of the sensors 522 or other components of the control system 500 to help navigate the craft 100 through maritime traffic or to avoid any other type of obstacle. For example, some examples of the control system 500 determine the position, orientation, and speed of the craft 100 based on data from the INS 514 and/or the GNSS 512, and the control system 500 may determine the location of an obstacle, such as a maritime vessel, a dock, or various other obstacles, based on data from the radar system 516, the lidar system 518, and/or the imaging system 520. Some examples of the control system 500 determine the location of an obstacle using the Automatic Identification System (AIS). Some examples of the control system 500 are configured to maneuver the craft 100 to avoid collision with an obstacle based on the determined position, orientation, and speed of the craft 100 and the determined location of the obstacle by actuating various control surfaces of the craft 100 in any of the manners described herein.

Some examples of the flight instrument system 524 include instruments for providing data about the altitude, speed, heading, orientation (e.g., yaw, pitch, and roll), battery levels, or any other information provided by the various other components of the control system 500.

Some examples of the flight controls 526 include one or more joysticks, thrust control levers, buttons, switches, dials, levers, or touch screen displays, etc. In operation, a pilot may use the flight controls 526 to operate one or more control surfaces (e.g., flaps, ailerons, elevators, rudder, propulsion propellers, etc.) of the craft 100 to thereby maneuver the craft 100 (e.g., control the direction, speed, altitude, etc., of the craft 100).

In some examples, the combinations of control surfaces on the craft 100 used by the control system 500 to control operations of the craft 100 depends on the mode of operation of the craft 100 and is determined based at least in part on aspects such as vehicle position, speed, attitude, acceleration, rotational rates, and/or altitude above water. Table 1 summarizes an example of the relationship between the control surfaces and the operation mode.

TABLE 1

| Control Surface | Hull-borne | Foil-borne | Wing-borne |
|---|---|---|---|
| Propulsion | Y | Y | Y |
| Aerodynamic Elevator | N | Y | Y |
| Aerodynamic Ailerons | N | Y | Y |
| Aerodynamic Rudder | Y | Y | Y |
| Aerodynamic Flaps | N | Y | Y |
| Hydrodynamic Elevator | Y | Y | N |
| Hydrodynamic Flaps | Y | Y | N |
| Hydrodynamic Rudder | Y | Y | N |

In some examples, the propulsion control surfaces in the table include the propeller assembly 116, as well as any propellers mounted to the hull 102, main hydrofoil assembly 108, or rear hydrofoil assembly 110. In some examples, the aerodynamic elevator control surfaces include elevator 126, the aerodynamic ailerons include ailerons 120, the aerodynamic rudder includes rudder 128 (when not submerged), the aerodynamic flaps include flaps 118, the hydrodynamic elevator includes rear hydrofoil control surfaces 140, the hydrodynamic flaps include main hydrofoil control surfaces 134, and the hydrodynamic rudder includes rudder 128 (when submerged).

In some examples, when actuating the control surfaces in the various examples, operational modes identified in Table 1 above, the control system 500 executes different levels of stabilization along the various vehicle axes during different modes of operation. Table 2 below identifies examples of stabilization controls that the control system 500 applies during the various modes of operation for each axis of the craft 100. Closed-loop control may comprise feedback and/or feed-forward control.

TABLE 2

| Vehicle Axis | Hull-borne | Foil-borne | Wing-borne |
|---|---|---|---|
| Pitch Axis | None | Closed-loop control on vehicle ride height | Closed-loop control on vehicle altitude |
| Roll Axis | None | Closed-loop control around vehicle bank angle = 0 | Stabilization and closed-loop control on heading |
| Yaw Axis | Rate stabilization | Closed-loop control on vehicle heading | Closed-loop control on vehicle heading |
| Speed Control | Closed-loop control on vehicle GPS Speed | Closed-loop control on vehicle GPS Speed | Closed-loop control on vehicle airspeed |

Further, in some examples, the control system 500 is configured to actuate different control surfaces to control the movement of the craft 100 about its different axes. Table 3 below identifies example axial motions that are affected by the various control surfaces of the craft 100.

TABLE 3

| Control Surface | Axis Control Function |
|---|---|
| Propulsion | (a) accelerate and decelerate the vehicle<br>(b) turn the vehicle about yaw axis<br>(c) create a rolling moment |
| Aerodynamic Elevator | (a) create a pitch up or pitch down moment |
| Aerodynamic Ailerons | (a) create a rolling moment<br>(b) increase lift on aerodynamic wing<br>(c) create a pitch-down moment |
| Aerodynamic Rudder | (a) create a yawing moment |
| Aerodynamic Flaps | (a) increase lift on aerodynamic wing<br>(b) create a pitch-down moment |
| Hydrodynamic Elevator | (a) create a pitch moment<br>(b) generate heave force on rear hydrofoil |
| Hydrodynamic Flaps | (a) generate heave force on main hydrofoil |
| Hydrodynamic Rudder | (a) create a yaw moment |

III. Example Modes of Operation

A. Hull-Borne Operation

Figure 6A:
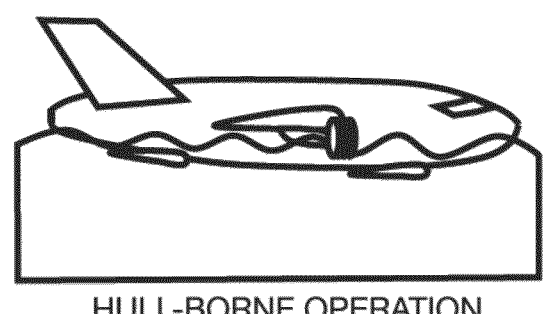
FIG. 6A is an illustration of a craft of an embodiment in a hull-borne mode of operation.

FIG. 6A illustrates an example of the craft 100 when the craft 100 is operating in a hull-borne mode. During this mode, the craft 100 is docked and floating on the hull 102, with the buoyancy of the outriggers 114 providing for roll stabilization of the craft 100. While docked, the battery system 400 of the craft 100 may be charged. In some examples, rapid charging is aided by an open or closed-loop water-based cooling system. In some examples, the surrounding body of water is used in the loop or as a heat sink. In some examples, the craft 100 includes a heat sink integrated into the hull 102 for exchanging heat from the battery system 400 to the surrounding body of water. In other examples, the heat sink is located offboard in order to reduce the mass of the craft 100.

Additionally, in some examples, the propeller assemblies 116 are folded in a direction away from the dock while the craft 100 is docked to help avoid collision with nearby structures or people. This folding may be actuated in various ways, such as by metal spring force, hydraulic pressure, electromechanical actuation, or centrifugal force due to propeller rotation. Other examples are possible as well. Further, in some examples, the main hydrofoil assembly 108 and the rear hydrofoil assembly 110 are retracted (or partially retracted) to avoid collisions with nearby underwater structures.

In some examples, when the craft 100 is ready to depart, the craft 100 uses its propulsion systems, including the propeller assemblies 116 and/or the underwater propulsion system (e.g., one or more propellers mounted to the hull 102, the main hydrofoil 130, and/or the rear hydrofoil 136), to maneuver away from the dock while remaining hull-borne. In some examples, the main hydrofoil assembly 108 and the rear hydrofoil assembly 110 remain retracted (or partially retracted) during this maneuvering to reduce the risk of hitting underwater obstacles near docks or in shallow waterways. However, when there is a limited risk of hitting underwater obstacles, the craft 100 may partially or fully extend the main hydrofoil assembly 108 and/or the rear hydrofoil assembly 110. With the main hydrofoil assembly 108 and/or the rear hydrofoil assembly 110 extended, the craft 100 actuates the main hydrofoil control surfaces 134 and/or the rear hydrofoil control surfaces 140 to improve maneuverability as described above.

In some examples, at low speeds during hull-borne operation, the control system 500 controls the position and/or rotation of the craft 100 by causing all of the propeller assemblies 116 to spin at the same idle speed, but with a first subset spinning in a forward direction and a second subset spinning in a reverse direction. For instance, in some examples, the control system 500 causes propeller assemblies 116a, 116c, 116e, 116h, 116j, and 116l to idle in reverse and propeller assemblies 116b, 116d, 116f, 116g, 116i, and 116l to idle forward. In this arrangement, the control system 500 causes the craft 100 to make various maneuvers without having to change the direction of rotation of any of the propeller assemblies 116. For instance, to induce a yaw on the craft 100, in some examples, the control system 500 increases the speed of the reverse propeller assemblies on one side of the main wing 104 while increasing the speed of the forward propeller assemblies on the other side of the main wing 104 and without causing any of the propeller assemblies to transition from forward to reverse or from reverse to forward. For example, idling the propellers at a nominal RPM may allow for a faster response in generating a yaw moment on the craft 100 because the propellers required for generating the yaw moment do not have to increase from zero RPM to the desired RPM value. They can spin from the idle RPM to the desired RPM value.

B. Foil-Borne Maneuvering Operation

Figure 6B:
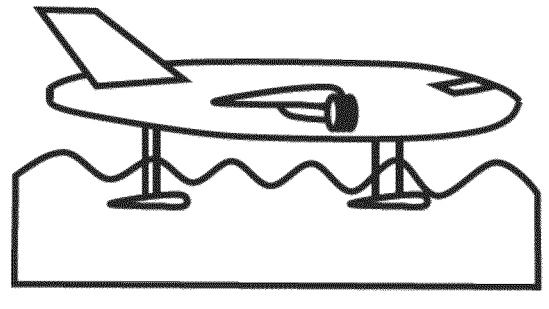
FIG. 6B is an illustration of a craft of an embodiment in a hydrofoil-borne maneuvering mode of operation.

FIG. 6B illustrates an example of the craft 100 when the craft 100 is operating in hydrofoil-borne maneuvering mode. During this mode, the craft 100 is configured to, for example, move through harbors and crowded waterways at speeds generally between 20-45 mph. In this regard, the craft 100 may extend the main hydrofoil assembly 108 and the rear hydrofoil assembly 110 (if not already extended) and accelerate using the previously described propulsion system towards a desired takeoff speed. During acceleration, the craft 100 reaches a speed at which the main hydrofoil assembly 108 and the rear hydrofoil assembly 110 alone support the weight of the craft 100, and the hull 102 is lifted above the surface of the water (e.g., by 3-5 ft) so that the hull is clear of any surface waves. After the hull 102 leaves the surface of the water, the drag forces exerted on the craft 100 drop significantly, and the amount of thrust required to maintain acceleration can be reduced. Therefore, in some examples, after the hull 102 has left the water, the control system 500 reduces the speed of the propeller assemblies 116 to lower the thrust of the craft 100.

Some examples of the control system 500 sustain this operational mode by actively controlling the pitch and speed of the craft 100 so that the main hydrofoil assembly 108 and the rear hydrofoil assembly 110 continue to entirely support the weight of the craft 100. In this regard, some examples of the control system 500 actuate the main hydrofoil control surfaces 134 and/or the rear hydrofoil control surfaces 140 and/or the propulsion system to stabilize the attitude of the craft 100 to maintain the desired height above the surface of the water, vehicle heading, and vehicle forward speed. In this regard, some examples of the control system 500 are configured to detect various changes in the yaw, pitch, or roll of the craft 100 based on data provided by the INS 514 and to make calculated actuations of the main hydrofoil control surfaces 134 and/or the rear hydrofoil control surfaces 140 to counteract the detected changes.

C. Foil-Borne Takeoff Operation

Figures 7A, 7B:
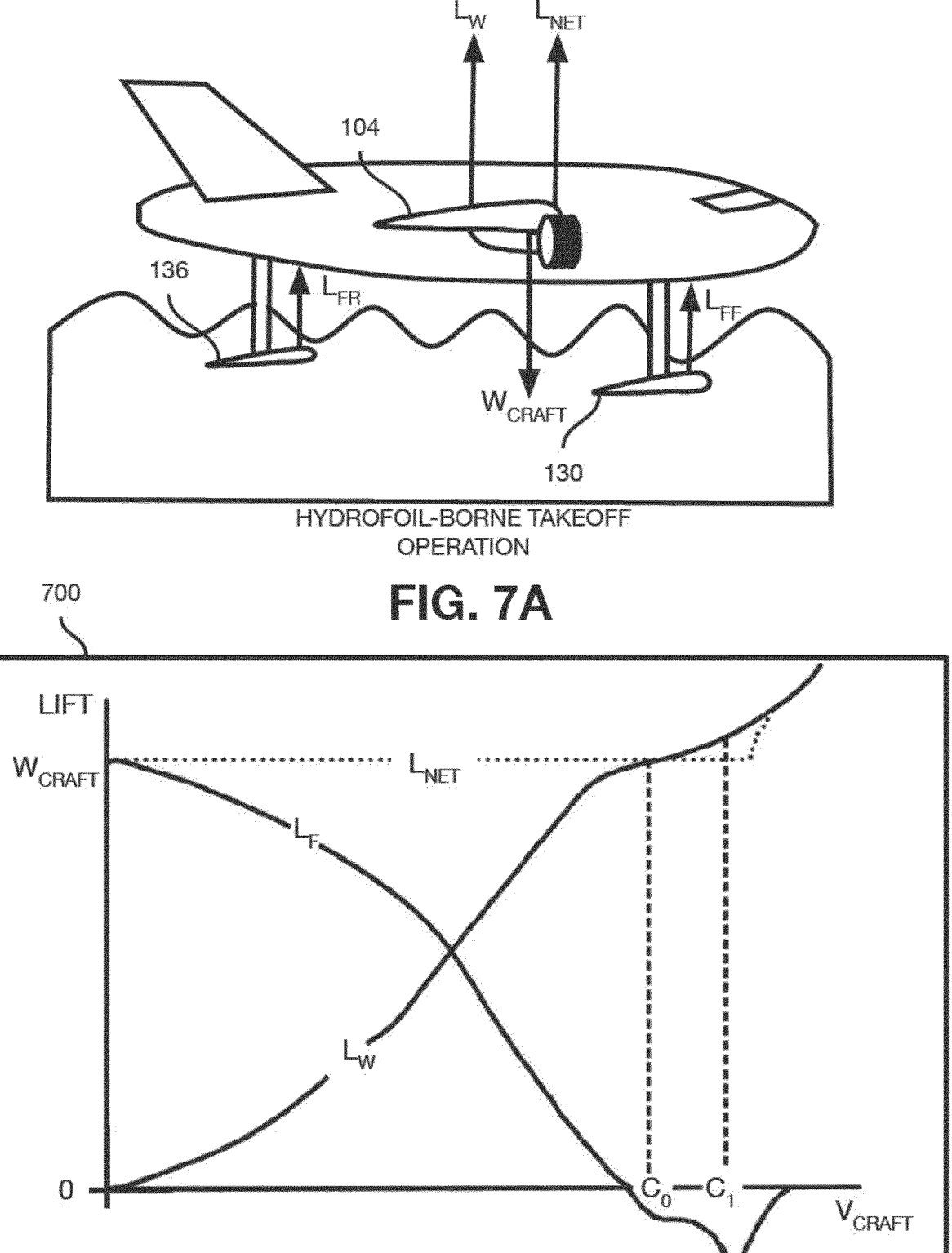
FIG. 7A is an illustration of a craft of an embodiment in a hydrofoil-borne takeoff mode of operation.
FIG. 7B is a graph that illustrates various lift forces acting on a craft of an embodiment.

FIG. 7A illustrates an example of the craft 100 when the craft 100 is operating in hydrofoil-borne takeoff mode. During this mode, the craft 100 is configured to, for example, move through open waters and obtain speeds generally between 40-50 mph to facilitate generating the lift required to become wing-borne.

Referring to FIG. 7A, aero lift, LW, generally represents the lift generated by the main wing 104 of the craft 100 but can also include the lift generated by other surfaces such as the tail wing, hull, or propulsive devices such as propellers, rotors, jets, etc. LF generally corresponds to the lift generated by one or more hydrofoils 130, 136 of the craft 100, where LFF corresponds to the lift generated by the front foil and the LFR corresponds to the lift generated by the rear foil. WCRAFT corresponds to the force of gravity exerted on the craft 100 and is also referred to as the weight of the craft. During steady state operation, WCRAFT generally corresponds to LW+LFR+LFF which also corresponds to LNET. Throughout the description, the term LF is generally understood to correspond to LFR+LFF.

As previously noted, some experimental craft developed by Applicant that include aero foils were unable to achieve the lift required to sustain flight. In these experimental craft, in an attempt to become airborne, the craft 100 would ramp up to a speed at which point the hydrofoil would breach the surface of the water, as WCRAFT<Lw+LF, and LF>0, resulting in Lw<WCRAFT. However, in order to takeoff from the water's surface, the aero lift must be greater than or equal to the weight of the craft, however prior to takeoff, the hydrofoils are still under the water's surface, and up until takeoff, have been generating lift (LF>0) as the aerodynamic lift has been insufficient for takeoff up until this point. If the hydro lift and the aero lift sum to greater than the weight of the craft, the vehicle will accelerate upwards and potentially create a premature takeoff condition (prior to condition C0 in FIG. 7B) as the aero lift, LW, generated by the wings, etc., of the craft 100 would be insufficient to sustain flight, and, as a result, the craft 100 would come back down and breach the water, ultimately preventing takeoff. The techniques disclosed below ameliorate these problems by controlling the hydrofoil lift vector, LF, specifically by generating downward forces of one or more hydrofoils 130, 136 of the craft 100 to keep the hydrofoils 130, 136 submerged until after the upwards aero lift, LW, is sufficient to allow the craft 100 to sustain flight.

In some examples, the lift LF is in the downward direction, and is introduced via the hydrofoil(s) as LW increases beyond WCRAFT while the craft 100 is increasing in speed in anticipation of takeoff. This allows the craft 100 to generate a greater overall aero lift, LW, prior to actual takeoff than would otherwise be possible. Then, at the appropriate time (e.g., when LW reaches some predetermined threshold such as the weight of the craft 100 or some margin thereof), the negative lift, LF, can be "released" from the craft 100, and the craft 100 can, as a result, proceed to become wing-borne.

FIG. 7B is an example of a graph 700 that relates these aspects. The relationships shown in the graph 700 and the ways in which various lift forces, thresholds, etc., are depicted are merely examples and are provided to aid understanding of the various operations and procedures described herein. As shown, the net lift, LNET, on the craft 100 initially corresponds to the combination of the aero lift, LW, generated by the wing (e.g., main wing, tail wing, etc.) and the lift, LF, generated by the hydrofoils 130, 136 (e.g., LNET=LW+LF). On the left side of the graph 700, the speed of the craft 100 is such that LNET is sufficient to allow the craft 100 to operate in hydrofoil-borne maneuvering mode but is insufficient to allow the craft 100 to become wingborne. Moving to the right of the graph 700 as speed increases, LW increases with increased craft 100 water speed. To maintain ride height and prevent the hydrofoils 130, 136 from breaching the water surface, LF is reduced in proportion to an increase in LW. For example, LF is adjusted with the speed of the craft 100 to maintain LNET at a margin equal to the weight, WCRAFT, of the craft 100, or small deviations about equal to control ride height. The overall lift provided by the hydrofoils 130, 136 may decrease at the same rate at which lift from the wing is increased towards zero or even become negative with increased speed. For example, just before the speed of the craft 100 reaches the speed associated with condition C0, LF may be reduced to zero. The conditions at C0 (e.g., speed of the craft 100, angle of attack of craft 100, deflection angles of control surfaces, angle of incidence of hydrofoils, etc.) may be such that LF may be zero or close to zero. At C0, the aero lift, LW, generated by the main wing 105 may be expected to be able to transition the craft 100 to a wing-borne mode of operation if the downwards hydrofoil lift, LF, were to be removed as LW=WCRAFT. Accordingly, at some time and/or increased speed after this point (e.g., speed associated with condition C1) where LW>WCRAFT, LF may be gradually or abruptly removed/released. This, in turn, allows LNET to approximately equal to or greater than WCRAFT which allows the craft 100 to take off and become wing-borne.

While not shown in the graph, in some examples, LF is not removed/released as described. Rather, as the craft 100 continues to accelerate, the downwards hydrofoil lift, LF, increases to a maximum downwards amount (e.g., a predetermined maximum amount and/or a maximum amount achievable due to the limitations of the control capabilities of the hydrofoil). As the aero lift, LW, generated by the main wing 105 continues to increase past this maximum amount of downwards hydrofoil lift, $L_F$, $L_{NET}$ increases in the upwards direction beyond $W_{CRAFT}$ and the craft 100 is pulled from the water. This, in turn transitions the craft 100 to a wing-borne mode of operation.

D. Wing-Borne Operation

Figure 8:
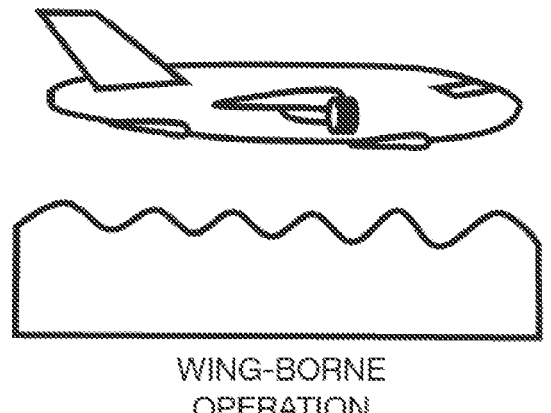
FIG. 8 is an illustration of a craft of an embodiment in a wing-borne mode of operation.

FIG. 8 illustrates an example of the craft 100 after becoming wing borne. In some examples, once the transition from hydrofoil-borne operation to wing-borne operation is complete, the control system 500 causes the main hydrofoil deployment system 200 and the rear hydrofoil deployment system 300 to respectively retract the main hydrofoil assembly 108 and the rear hydrofoil assembly 110. In some examples, the control system 500 initiates this retraction as soon as the hydrofoil assemblies 108, 110 are clear of the water to reduce the chance of the hydrofoil assemblies 108, 110 reentering the water. The control system 500 may determine that the hydrofoil assemblies 108, 110 are clear of the water in various ways. For instance, in an example, the control system 500 makes such a determination based on a measured altitude of the craft 100 (e.g., based on data provided by the radar system 516, the lidar system 518, and/or the other sensors 522 described above for measuring an altitude of the craft 100). In another example, the sensors 522 may further include one or more conductivity sensors, temperature sensors, pressure sensors, strain gauge sensors, or load cell sensors arranged on the hydrofoil assemblies 108, 110, and the control system 500 may determine that the hydrofoil assemblies 108, 110 are clear of the water-based on data from these sensors.

Once the craft 100 is clear of the water, the control system 500 continues to accelerate the craft 100 to the desired cruise speed by controlling the speed of the propeller systems 116. In some examples, the control system 500 retracts the flap systems when the craft 100 has achieved sufficient airspeed to generate enough lift to sustain altitude without them and actuates various control surfaces of the craft 100 and/or applies differential thrust to the propeller systems 116 to perform any desired maneuvers, such as turning, climbing, or descending, and to provide efficient lift distribution. While in wing-borne mode, the craft 100 can fly both low over the water's surface in ground-effect or above ground-effect depending on operational conditions and considerations.

E. Return to Hull-Borne Operation

To facilitate transitioning from wing-borne to hull-borne mode of operation (See FIG. 6A), the control system 500 determines that the hydrofoil assemblies 108, 110 are fully or partially retracted so that the craft 100 may safely land on its hull 102. In some examples, the control system 500 additionally determines and suggests the desired landing direction and/or location-based on observed, estimated, or expected water surface conditions (e.g., based on data from the radar system 516, the lidar system 518, the imaging system 520, or other sensors 522).

The control system 500 initiates deceleration of the craft 100, for instance, by reducing the speeds of the propeller systems 116 until the craft 100 reaches a desired landing airspeed. (The control system 500 can also be used to implement the functioned noted in the following sections.) During the deceleration, the control system 500 may deploy the flaps 118 to increase lift at low airspeeds and/or to reduce the stall speed. Once the craft 100 reaches the desired landing airspeed (e.g., approximately 50 knots), the control system 500 reduces the descent rate (e.g., to be less than approximately 200 ft/min). As the craft 100 approaches the surface of the water (e.g., once the control system 500 determines that the craft 100 is within 5 feet of the water surface), the control system 500 further slows the descent rate to cushion the landing (e.g., to be less than approximately 50 ft/min). As the hull 102 of the craft 100 impacts the surface of the water, the control system 500 reduces thrust, and the craft 100 rapidly decelerates due to the presence of hydrodynamic drag, the reduction in forward thrust, and the reduction or elimination of blowing air over the wing which significantly reduces lift causing the vehicle to settle into the water. The hull 102 settles into the water as the speed is further reduced until the craft 100 is stationary.

In some examples, after the craft 100 is settled in the water, the craft 100 is transitioned back to hydrofoil-borne maneuvering mode (See FIG. 6B) by extending the hydrofoil assemblies 108, 110 to transition from hull-borne operation to hydrofoil-borne operation in the same manner as described above. In some examples, the control system 500 then sustains the hydrofoil-borne mode at the fifth stage and maneuvers the craft 100 into port while keeping the hull 102 insulated from surface waves. The control system 500 then reduces the thrust generated by the propeller assemblies 116 to lower the speed of the craft 100 until the hull 102 settles into the water, thereby transitioning that craft back to hull-borne operation at the sixth stage. The control system 500 then retracts the hydrofoil assemblies 108, 110 and performs the hull-borne operations described above to maneuver the craft 100 into a dock for disembarking passengers or goods and recharging the battery system 400.

V. Winglet Control Surfaces

As noted above, in some embodiments, the craft takes the form of a seaglider that is designed to glide very close to the surface of a body of water (e.g., at an altitude of about the wingspan of the craft) in order for the ground effect to reduce drag, increase lift, and increase efficiency and/or for regulatory reasons. However, because the craft glides so close to the surface, the degree at which the craft can bank to provide a desired centripetal side force to laterally move the craft is limited. The bank angle can be further reduced when the distance between the craft and the water surface is decreased due to, for example, wave height fluctuations, rogue waves, and/or wind gusts pushing the craft downward. Some aspects described herein can also be applicable for traditional aircraft (e.g., during landing/takeoff (when close to the ground) under severe wind conditions).

Figure 9A:
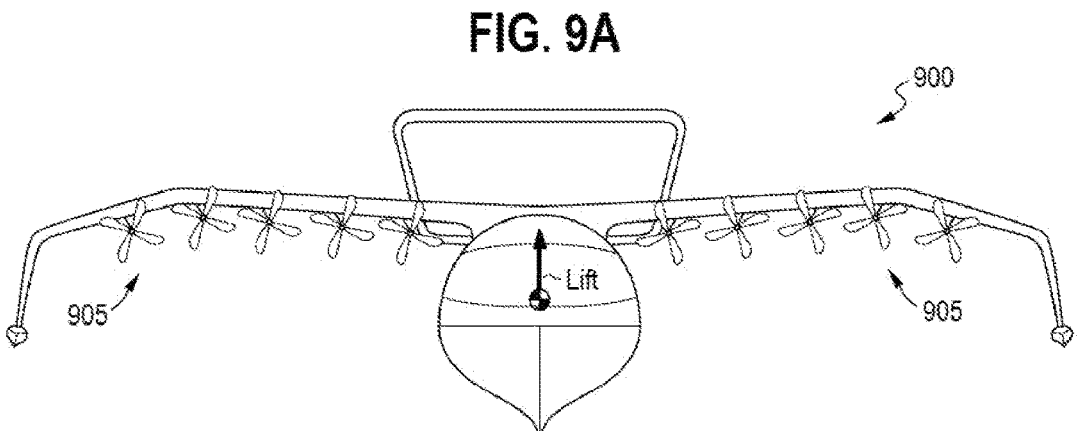
FIG. 9A is a front view of a craft of an embodiment.
Figure 9B:
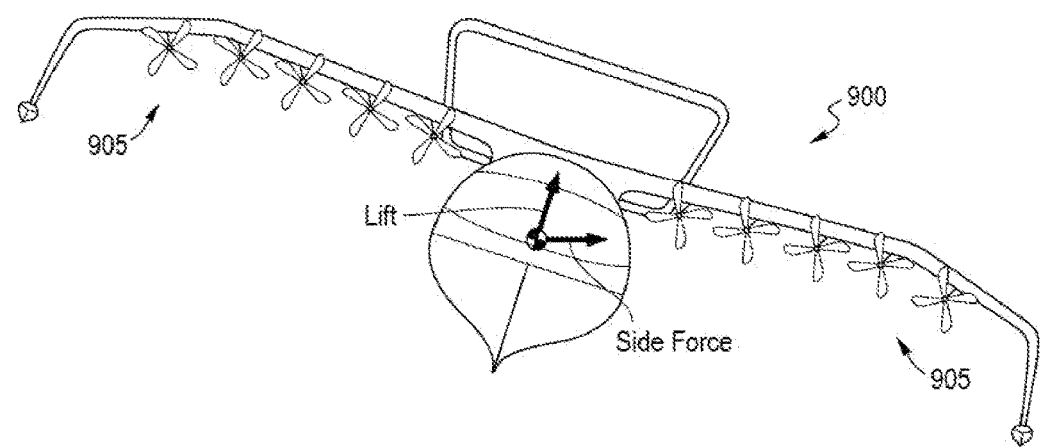
FIG. 9B is a front view of a craft of an embodiment undergoing a bank angle turn that creates a side force via lift.

As mentioned above and with reference to FIGS. 9A and 9B, one way to address this problem is by turning off or reducing the rotational speeds of various propellers of the propeller assemblies 905 of the craft 900 to generate an asymmetrical thrust to create a yawing moment on the craft 900. This allows the craft 900 to turn without large bank angles and increases the turning maneuverability of the craft 900. For example, as shown in FIG. 9B, to yaw port, the craft 900 may increase the rotational speeds of one or more propellers on the starboard side of the craft 900 (and/or decrease the rotational speeds of one or more propellers on the port side of the craft 900), which creates a side force that pushes the craft 900 port. Similarly, to yaw starboard, the craft 900 may increase the rotational speeds of one or more propellers on the port side of the craft 900 (and/or decrease the rotational speeds of one or more propellers on the starboard side of the craft 900). Alternatively, the propeller (s) can be tilted while the craft 900 is moving to yaw or roll the craft 900. Additional information regarding airspeed control in a blown wing aircraft can be found in U.S. Patent Application No. 63/490,342, filed on Mar. 14, 2023, which is hereby incorporated by reference.

In another embodiment, winglet control surfaces (sometimes referred to herein as winglet effectors or control structures) are used to provide a side force without inducing a yawing moment on the craft. As used herein, a winglet can refer to a vertical projection (up or down) on the tip of the distal end of the wing (i.e., on the wingtip). Winglet control surfaces can help improve turning of the craft. More specifically, to complete a turn, a craft produces centripetal aero force (in particular, side force) to counter centrifugal force of the craft. Theoretically, centripetal force is equal to $m*V^2/r$, where m is the craft's mass, Vis velocity, and r is turn radius. This force typically comes as a component of lift from bank angle of the vehicle $\Phi$. Side Force=Lift*sin ($\Phi$). By using winglet control surfaces to produce at least some of the necessary centripetal force to counter the centrifugal force, the bank angle can be reduced in a turn (in one embodiment, the generated side force has about three times as much centripetal force as the centripetal force created by banking alone).

This embodiment will now be illustrated with reference to FIG. 10. It is important to note that while this embodiment will describe winglet control surfaces that can be used to operate a seaglider, these embodiments can be used with any suitable type of craft. So, specifics of any particular type of craft should not be read into the claims unless expressly recited therein.

Figure 10:
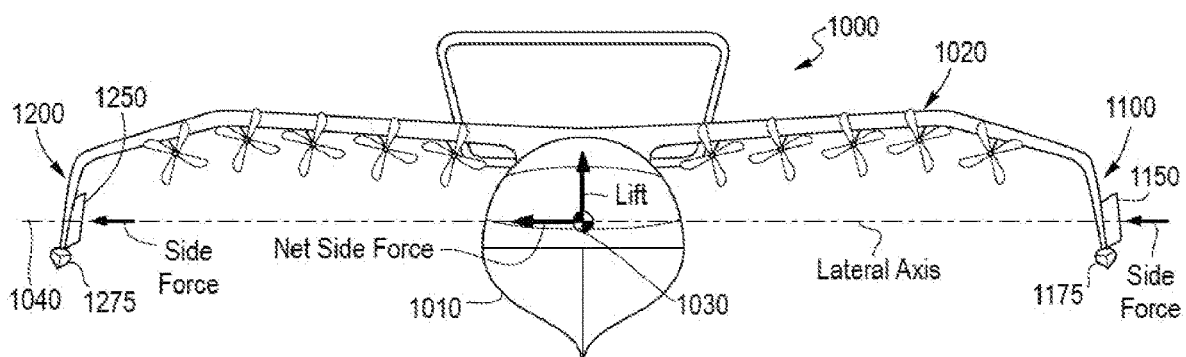
FIG. 10 is a front view of a craft of an embodiment using winglet control surfaces to generate a side force.

As shown in FIG. 10, the craft 1000 of this embodiment comprises a body 1010 and a wing 1020 (e.g., a main wing). The body 1010 defines a longitudinal axis 1030 that runs longitudinally through the center of the body 1010, and the wing 1020 defines a lateral axis 1040 that runs perpendicular to the longitudinal axis 1030. The center of mass of the craft 1000 is along the lateral axis 1040. In one embodiment, the lateral axis 1040/center of mass is about a quarter of the way back from the leading edge of the wing 1020.

In this embodiment, the wing 1020 comprises end portions, which are referred to herein as winglets (or wingtips) 1100, 1200, that bend downward with respect to the wing 1020. (As will be discussed below, in other embodiments, the wingtips bend upward with respect to the wing). Also in this embodiment, the wingtips 1100, 1200 support outriggers 1175, 1275 that keep the craft 1000 afloat in water. As noted above, these embodiments can be used with other types of crafts (e.g., those that do not have outriggers, crafts not designed to fly in ground effect, etc.).

In this embodiment, the winglets 1100, 1200 comprise respective movable, hinged control surfaces 1150, 1250 on the trailing edges of the wingtips 1100, 1200. Because the wingtips 1100, 1200 bend downward with respect to the wing 1020, the control surfaces 1150, 1250 are substantially vertical. The control surfaces 1150, 1250 can be movable by an actuator that is controlled by a control system (e.g., a Digital Flight Control System (DFCS)) of the craft 1000. Any suitable type of actuator can be used, such as, but not limited to, an electro-mechanical actuator (e.g., an electronically-controlled motor) or a cable-based actuator. Also, as will be discussed below, the control system of the craft 1000 can deploy the control surfaces 1150, 1250 in the same direction simultaneously (e.g., to rotate both control surfaces 1150, 1250 at the same time and at the same angle). Alternatively, the control system of the craft 900 can operate the control surfaces 1150, 1250 independently (e.g., rotating one control surfaces 1150, 1250 but not the other, rotating the control surfaces 1150, 1250 in different directions, rotating the control surfaces 1150, 1250 in the same direction but at different angles, etc.). While winglet control surfaces can be implemented as wing pairs that generally operate together, it is possible to deploy a single winglet control surface to introduce a yawing moment and increase yaw authority.

Figure 11A:
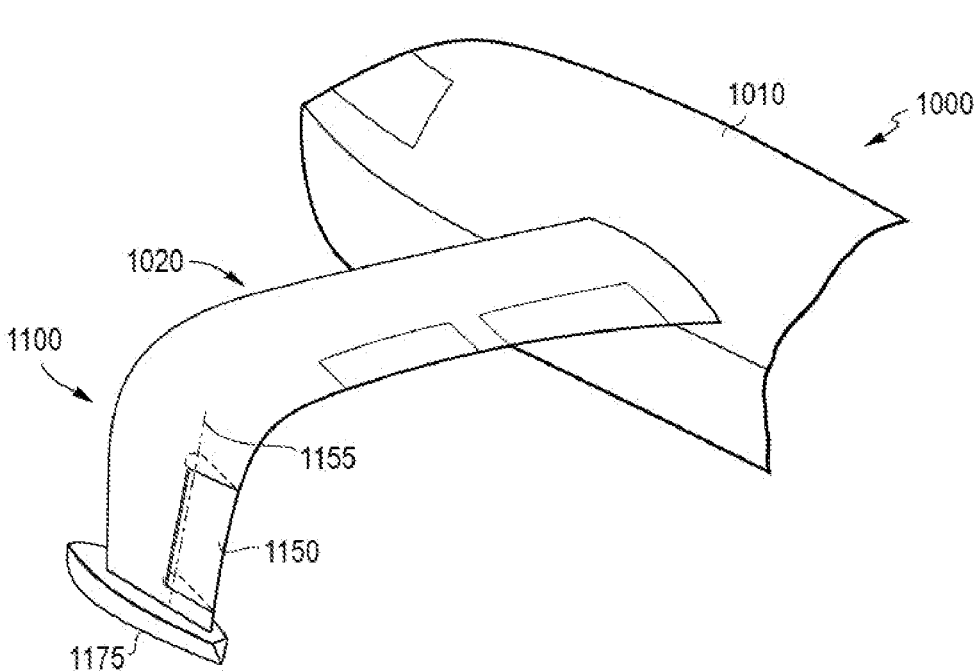
FIG. 11A is a rear, port view of a portion of a craft of an embodiment with a winglet control surface in a non-deployed position.
Figure 11B:
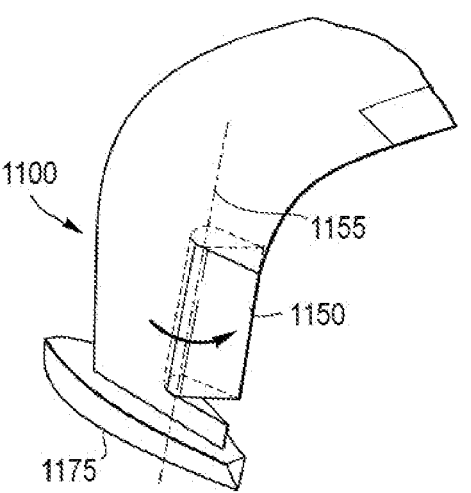
FIG. 11B is a rear, port view of a portion of a craft of an embodiment with a winglet control surface in a deployed-starboard position.
Figure 11C:
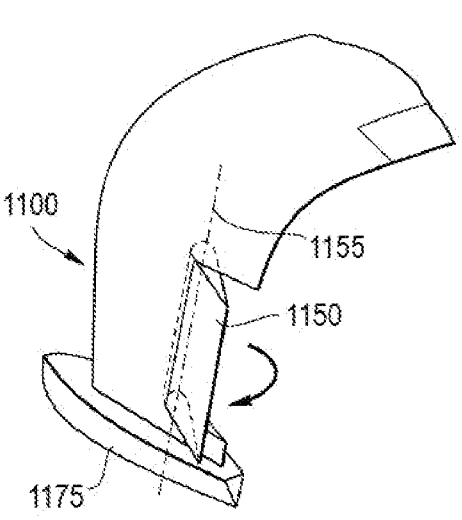
FIG. 11C is a rear, port view of a portion of a craft of an embodiment with a winglet control surface in a deployed-port position.
Figure 12A:
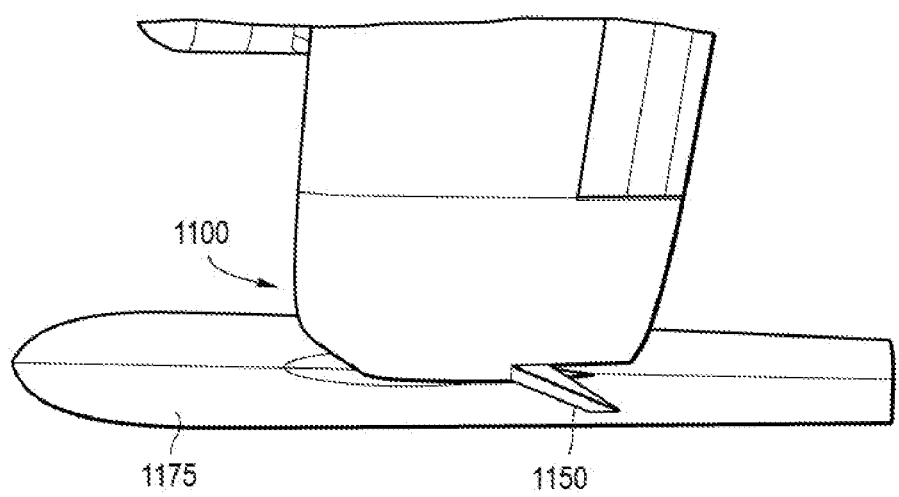
FIG. 12A is a top view of a portion of a craft of an embodiment with a winglet control surface in a deployed-port position.
Figure 12B:
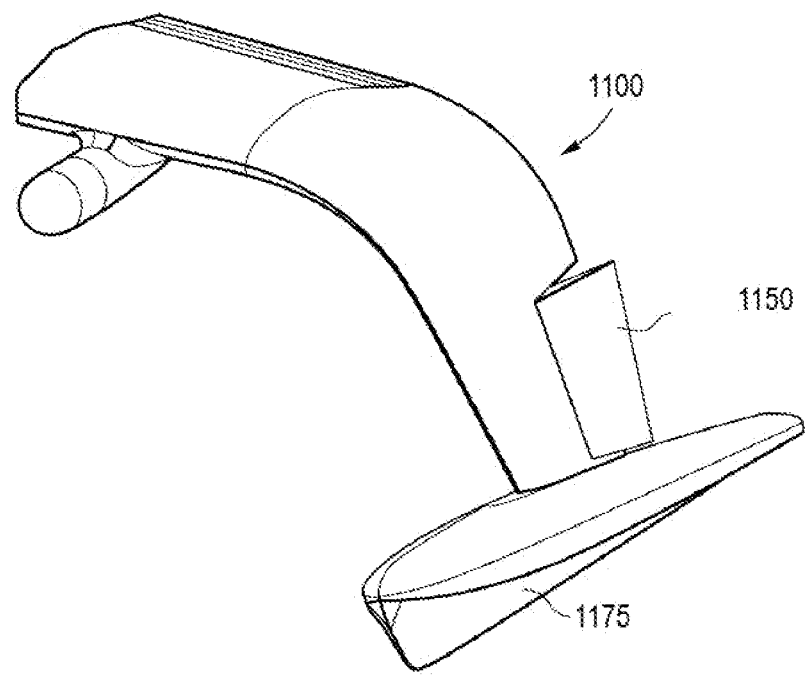
FIG. 12B is a front, port view of a portion of a craft of an embodiment with a winglet control surface in a deployed-port position.

As shown in FIGS. 11A-C, the control surface 1150 is rotatable about an axis 1155 and movable between a non-deployed position (FIG. 11A), a starboard-deployed position (FIG. 11B), and a port-deployed position (FIG. 11C). FIGS. 12A and 12B are top and front, port views showing the control surface 1150 in a deployed-port position. (These and other drawings show only one of the pairs of winglet control structures to simplify the drawings and discussion. It should be understood that the operation of the other winglet control structure would operate similarly.)

When both of the control surfaces 1150, 1250 are in a non-deployed position, the control surfaces 1150, 1250 do not provide an additional aerodynamic control effect on the craft 1000 (i.e., the aerodynamic effect is the same as if the winglets 1100, 1200 did not have the control surfaces 1150, 1250). However, moving one or both of the control surfaces 1150, 1250 to a deployed position changes the aerodynamic shape of the wing 1020 and can provide a force to the craft 1000. For example, as shown in FIG. 10, when the control surfaces 1150, 1250 are both in a deployed-port position, a net side force is generated along the lateral axis 1040. Because the lateral axis 1040 runs through the center of mass of the craft 1000, the generated force is a normal side force, so the craft 1000 is moved sideways without creating a significant yawing moment on the craft 1000 (thus, not significantly changing the forward heading of the craft 1000). With this embodiment, the craft 1000 can be moved laterally without having to substantially bank the craft 1000. (Alternatively, the generated side force can be used in conjunction with banking to reduce the amount of banking needed.) This can be especially beneficial for crafts that fly close to the surface (e.g., water) and have limited banking angle maneuverability.

As mentioned above, to achieve a pure side force, the control surfaces 1150, 1250 should be positioned on the winglets 1100, 1220 in such a way that the generated force is along the lateral axis 1040 that runs through the center of mass of the craft 1000 (or nearly through the center of mass, as noted in the following paragraph). Generally speaking, the control surfaces 1150, 1250 are positioned laterally outboard or substantially laterally outboard from the center of mass of the craft 1000. Depending on the geometry of the control surfaces 1150, 1250, the control surfaces 1150, 1250 may be positioned along the lateral axis 1040 or slightly rearward or forward of the lateral axis 1040. That is, it is the generated side force—not necessarily the position of the control surfaces 1150, 1250—that should be toward the center of mass of the craft.

Also, as used herein, "a side force toward the center of mass of the craft" (or along the lateral axis) can be directly toward the center of mass of the craft or substantially toward the center of mass of the craft, such that no or minimum additional forces are generated that would create a yawing moment on the craft (e.g., not enough to cause a significant departure of the forward heading of the craft). In contrast, control surfaces positioned substantially away from the lateral axis (e.g., on the tail of the craft) would create significant additional forces that would create a yawing moment on the craft that would cause a significant departure of the forward heading of the craft. For example, a canard airplane rudder, which is substantially offset forward or rearward from the craft's center of mass, can have a winglet control surface used to replace a rudder and provide a longitudinal moment arm that would induce a yawing moment on the craft. Other examples of control surfaces that induce a yawing moment rather than a pure side force include rudder-ailerons on swept wings and a traditional tail rudder.

Also, depending on variables, such as the craft's payload, the center of mass may be substantially along the lateral axis 1040 instead of directly on it. So, as used herein, the center of mass of a craft is "along the lateral axis" when the center of mass is along or substantially along the lateral axis such that generated side force is substantially toward the center of mass of the craft, so that no or minimum additional forces are generated that would create a yawing moment on the aircraft (e.g., not enough to cause a significant change in the forward heading of the craft). In contrast, control surfaces on the tail of the craft would create significant additional forces that would create a yawing moment on the craft that would cause a significant change in the forward heading of the craft.

Figure 13A:
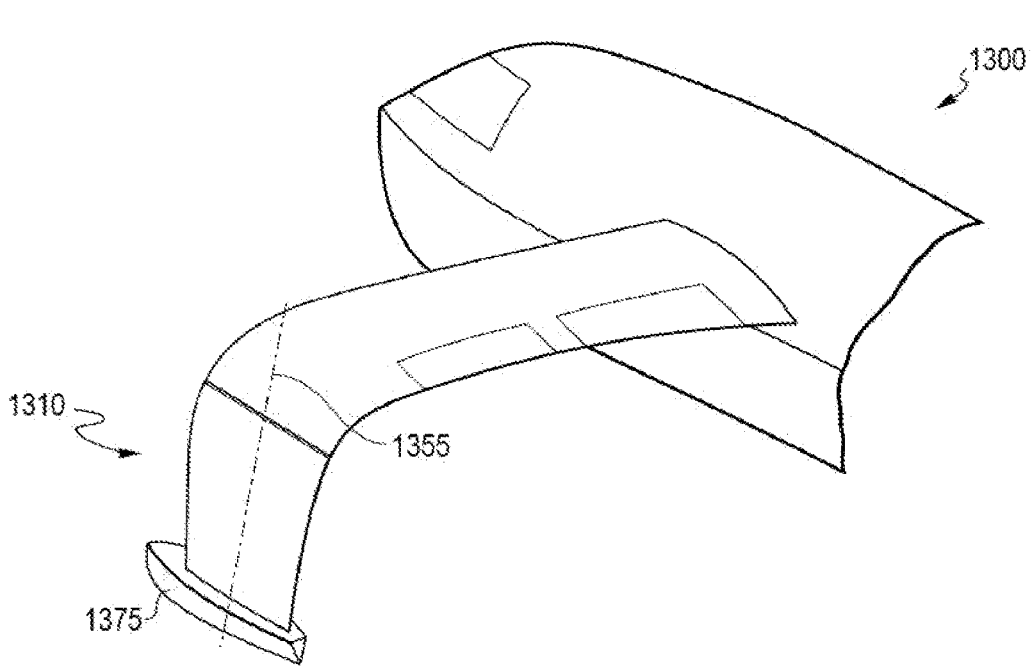
FIG. 13A is a rear, port view of a portion of a craft of an embodiment with a movable winglet-outrigger structure in a non-deployed position.
Figures 13B, 13C:
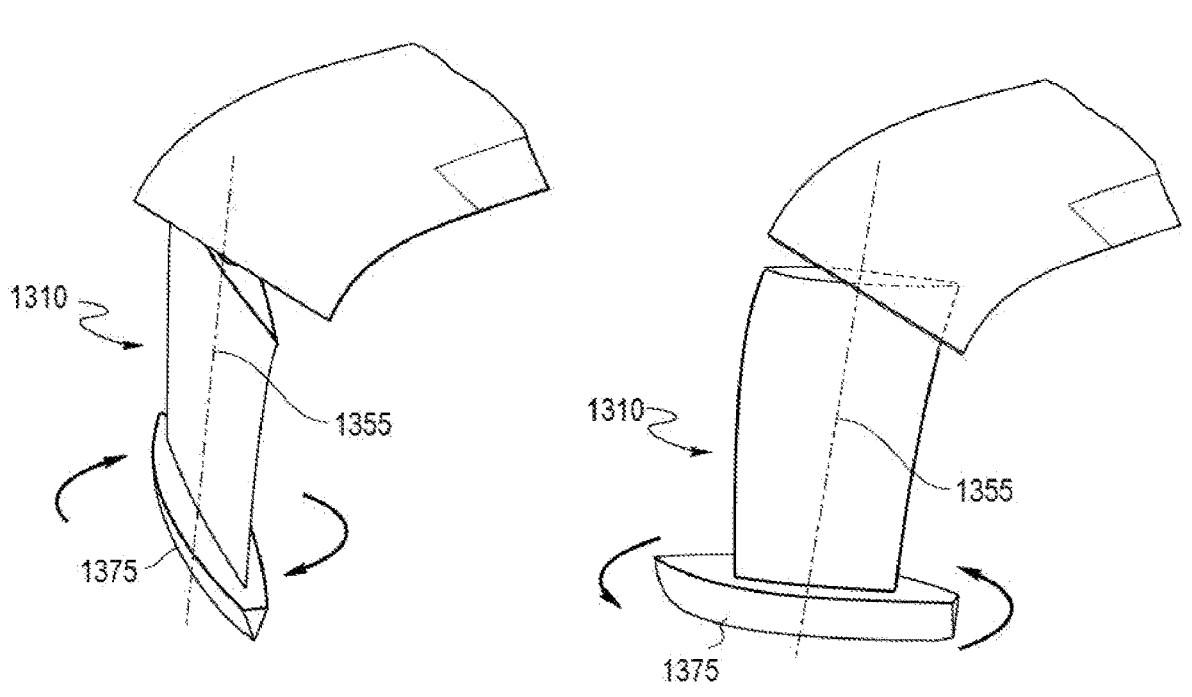
FIG. 13B is a rear, port view of a portion of a craft of an embodiment with a movable winglet-outrigger structure in a deployed-port position.
FIG. 13C is a rear, port view of a portion of a craft of an embodiment with a movable winglet-outrigger structure in a deployed-starboard position.
Figure 14A:
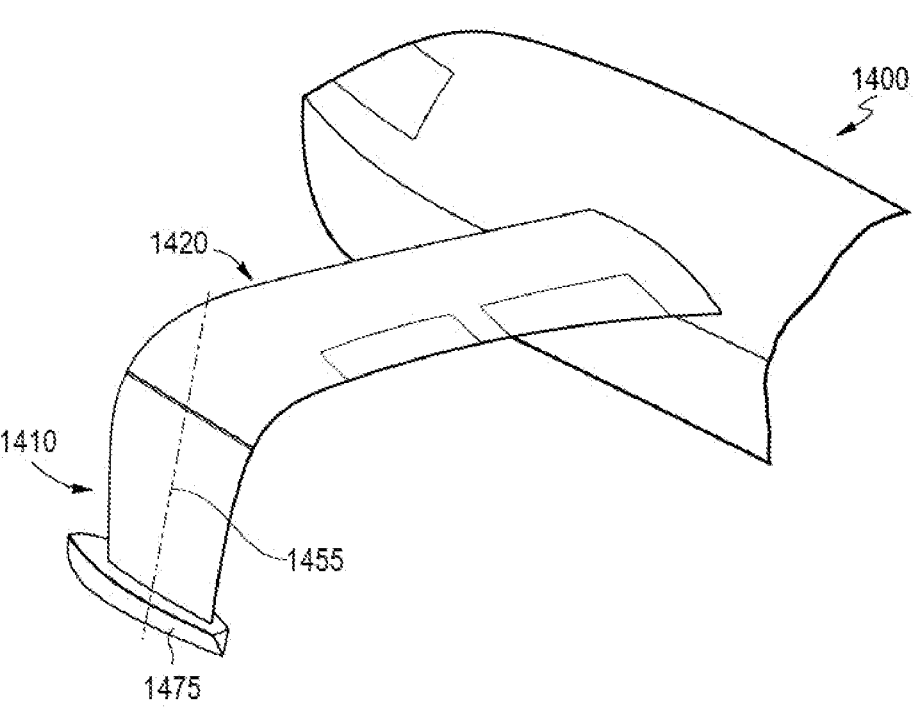
FIG. 14A is a rear, port view of a portion of a craft of an embodiment with a winglet, which is movable with respect to an outrigger, in a non-deployed position.
Figures 14B, 14C:
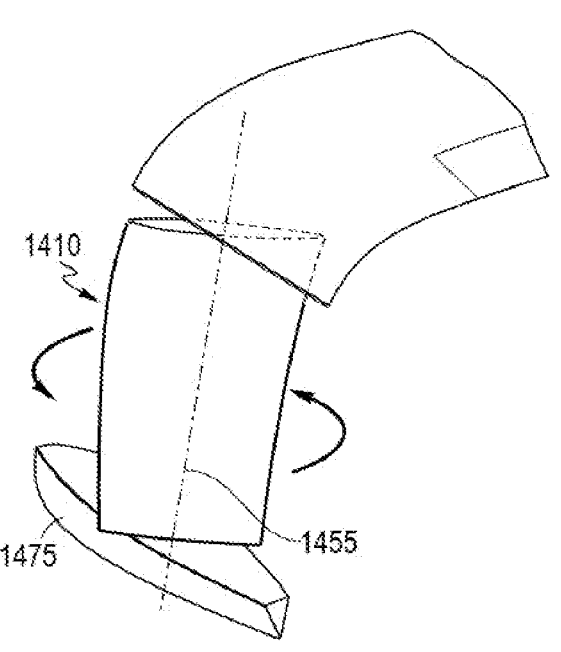
FIG. 14B is a rear, port view of a portion of a craft of an embodiment with a winglet, which is movable with respect to an outrigger, in a deployed-port position.
FIG. 14C is a rear, port view of a portion of a craft of an embodiment with a winglet, which is movable with respect to an outrigger, in a deployed-starboard position.

There are many alternatives that can be used with these embodiments. For example, in the above embodiment, the control surfaces 1150, 1250 were part of the winglets 1100, 1220. In another embodiment (shown in FIGS. 13A-13C), the entire winglet 1310 serves as the control surface and is rotatable about an axis 1355 to move the winglet 1310 (and attached outrigger 1375) between non-deployed and deployed positions. In another embodiment, shown in FIGS. 14A-14C, the winglet 1410 is rotatable about an axis 1455 to move the winglet 1410 with respect to a fixed outrigger 1475. As with the above embodiments, the movement of the control surface 1310, 1410 while the craft is in motion and/or in the presence of a significant side wind causes a side force along the lateral axis.

Figure 15A:
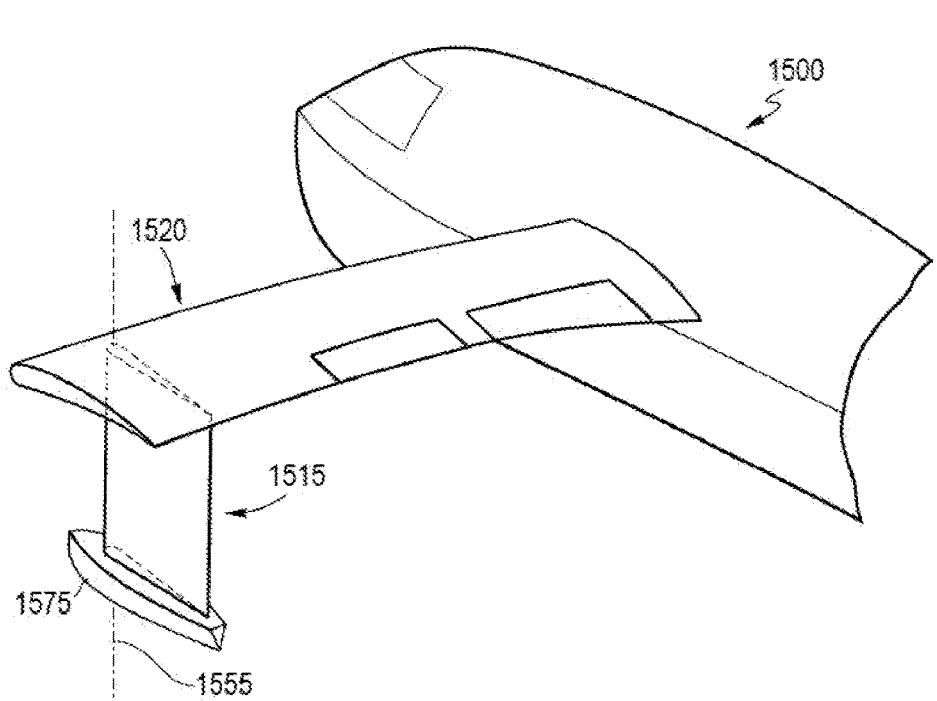
FIG. 15A is a rear, port view of a portion of a craft of an embodiment with a movable outrigger and support structure in a non-deployed position.
Figure 15B:
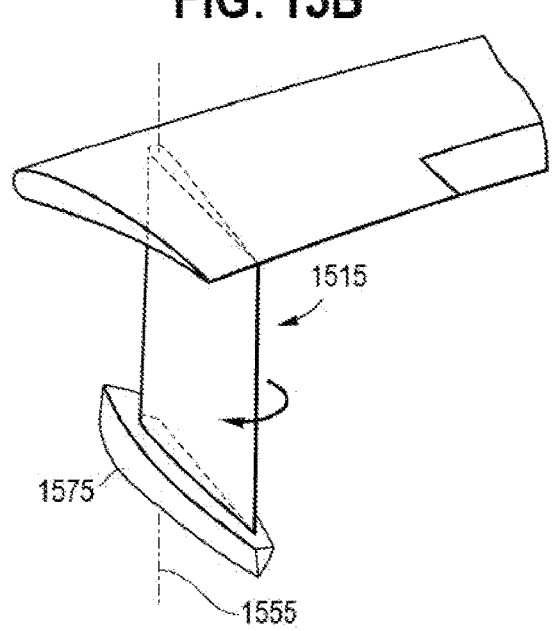
FIG. 15B is a rear, port view of a portion of a craft of an embodiment with a movable outrigger and support structure in a deployed-port position.
Figure 15C:
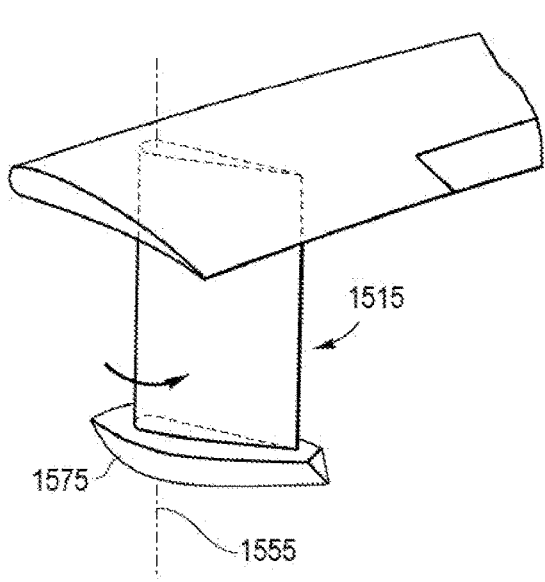
FIG. 15C is a rear, port view of a portion of a craft of an embodiment with a movable outrigger and support structure in a deployed-starboard position.

As noted above, these embodiments can be used with any suitable type of craft. For example, in FIGS. 15A-15C, another type of craft 1500 does not have winglets but has a vertical structure 1515 that supports an outrigger 1575. The vertical structure 1515 is rotatable about an axis 1555 to act as a control surface to generate a side force along the center of mass of the craft 1500. While FIGS. 15A-C show the outrigger 1575 rotating along with the vertical structure 1515, in other embodiments, the outrigger 1575 is fixed and the vertical structure 1515 moves with respect to the structure (similar to FIGS. 14A-14C).

Many other alternatives can be used. For example, in FIGS. 16A-C, another type of craft 1600 has winglets (port winglet 1610 shown in the drawings) that bend upward with respect to the wing 1620. The winglets have control surfaces (port control surface 1610 shown in the drawings) that generate the side force described above. In the example shown in FIGS. 16A-C, the craft 1600 has a structure 1615 to support an outrigger 1675. In other crafts, upward- (or downward-) bending winglets are used, and the craft does not have outriggers/outrigger support structures.

Figure 17:
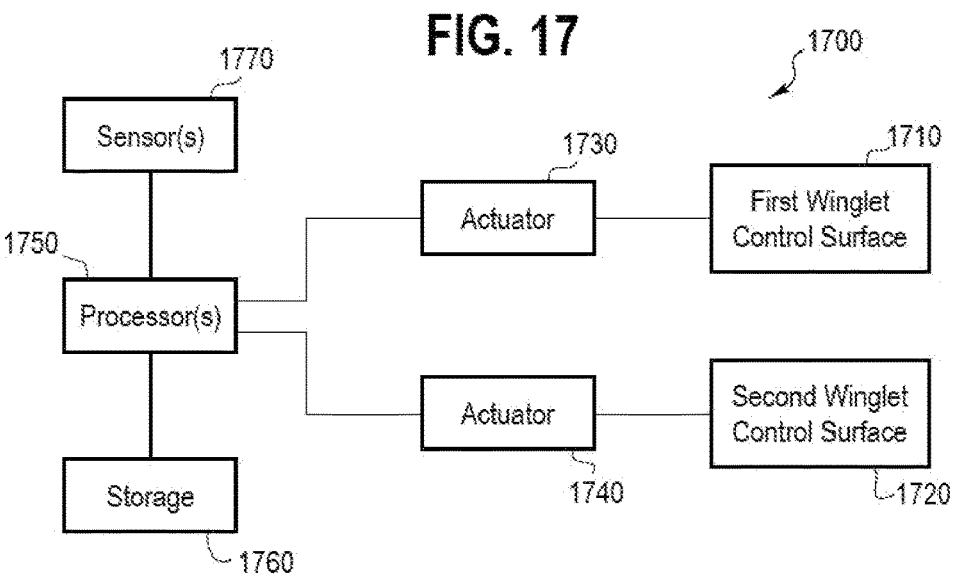
FIG. 17 is a block diagram of a control system of an embodiment.

Turning again to the drawings, FIG. 17 is a block diagram of a control system 1700 of an embodiment. As shown in FIG. 17, the control system 1700 of this embodiment comprises an actuator 1730 for a first winglet control surface 1710, an actuator 1740 for a second winglet control surface 1720, processor(s) 1750 (see also 502 of FIG. 5), storage 1760, and sensor(s) 1770 (see also 522 of FIG. 5)). As noted above, the actuators 1730, 1740 can take any suitable form. Also, while two actuators 1730, 1740 are shown in FIG. 17, a single actuator configured to move both the first and second winglet control surfaces 1710, 1720 can be used.

In this embodiment, the processor(s) 1750 are configured (e.g., by being able to execute computer-readable program code stored in the storage 1760) to actuate the first and second winglet control surfaces 1710, 1720 to generate a side force to laterally move the craft. For example, the processor(s) 1750 can be configured to generate control signals to cause the actuators 1730, 1740 to move the first and second winglet control surfaces 1710, 1720 in response to a command (e.g., from a pilot of the craft via a yoke or other user input element, or from a DCFS running on the same or different processor(s) of the craft, for example, when an autopilot is used). For instance, the craft may receive a "left turn" command with the left rudder and simultaneously cause right deflection of the winglet control surfaces 1710, 1720.

Additionally or alternatively, the processor(s) 1750 can be configured to automatically generate control signals to cause the actuators 1730, 1740 to move the first and second winglet control surfaces 1710, 1720 in response to reading(s) from the sensor(s) 1770. This can be beneficial, for example, to align the longitudinal axis of the craft with a runway or landing zone, which may be at least partially defined by elements of the sea state, and/or to be corrected for a detected side drift. An example of this operation is shown in the flow chart 1800 in FIG. 18.

Figure 18:
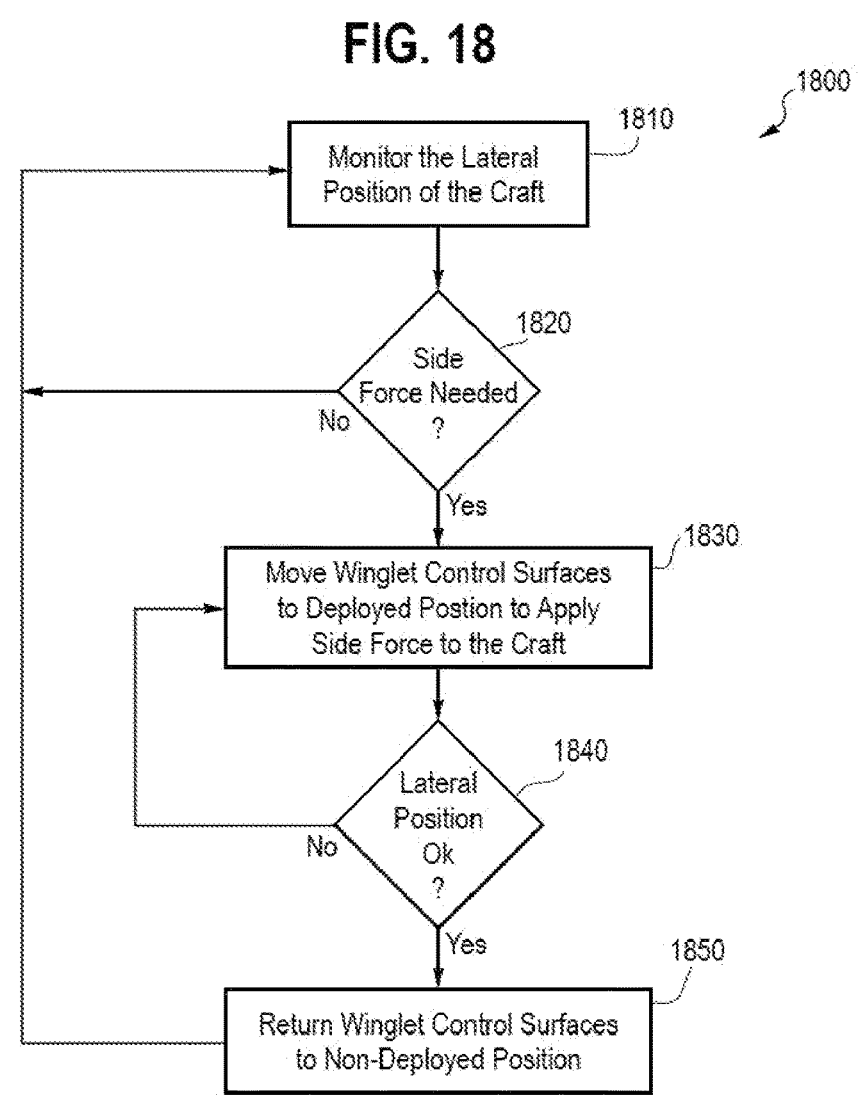
FIG. 18 is a flow chart of a method of an embodiment for actuating winglet control surfaces of a craft.

As shown in FIG. 18, the processor(s) 1750 monitor reading(s) of the sensor(s) 1770 (e.g., continuously or at some interval) indicative of the lateral position of the craft (act 1810). For example, the sensor(s) 1770 can be a global positioning system (GPS) location sensor that can detect an unintended change in lateral position of the craft due to a crosswind or wind gust. As another example, the sensor(s) 1770 can be an accelerometer that can detect a side skid. In another example, the sensor(s) 1770 can be an inertial measurement unit (IMU) that measures and reports forces, orientation, angular rate, etc. As yet another example, the sensor(s) 1770 can be a wave state estimator that determines the height or other states of the waves below the craft (e.g., to determine whether or not banking (or how much banking) can be used given the estimated wave height). Examples of some of the suitable types of wave state estimators that can be used are disclosed in U.S. patent application Ser. No. 17/875,942, filed Jul. 28, 2022, which is hereby incorporated by reference. In an additional example, the sensor(s) 1770 can be a radar (see also 516 of FIG. 5), lidar (see also 517 of FIG. 5), or other type of sensor that can detect a possible collision with another object (e.g., based on the determined position, orientation, and speed of the craft and the determined location of an obstacle), where a side force can be generated to avoid a collision. Other types of sensors and readings can be used.

Next, the processor(s) 1750 determine if the monitored reading(s) of the sensor(s) 1770 indicate that a side force needs to be applied to the craft (e.g., to correct for a wind gust) (act 1820). If a side force is not needed, the processor(s) 1750 continue monitoring (act 1810). However, if a side force is needed, the processor(s) 1750 send a control signal to the actuators 1730, 1740 to move the first and second winglet control surfaces 1710, 1720 to a deployed position to apply a side force to the craft (act 1830). The direction and degree of deployment can be determined based on the corrective force that is determined to be needed. The processor(s) 1750 then determine if the adjusted lateral position is ok (e.g., did the adjusted lateral position cancel a side skid?) (act 1840). If the adjusted lateral position is ok, the processor(s) 1750 return the first and second winglet control surfaces 1710, 1720 to their non-deployed position (act 1850) and the method loops back to act 1810. If the adjusted lateral position is not ok, the processor(s) 1750 cause the actuators 1730, 1740 to further move the first and second winglet control surfaces 1710, 1720 (act 1830). Other actions can be taken. For example, if the lateral position is not correctable with maximum deflection of the winglet control surfaces 1710, 1720, the processor(s) 1750 can send commands to move the ailerons up to down to bank the craft and/or can adjust the height of the craft above the water using an elevator to maintain wave clearance. Also, as another example, the lateral position of the craft can be ok, but the winglet control surfaces may need to remain deployed to counter a continuing force (e.g., a side force from continuing wind) that would otherwise move the craft back to an undesired position.

There are many advantages associated with these embodiments. For example, these embodiments can provide improved turning, which may be especially beneficial for wing-in-ground effect vehicles (WIGs), such as a seaglider (although any suitable type of craft can benefit from these embodiments). More specifically, a coordinated turn in a traditional aircraft requires banking (otherwise, it becomes a skidded turn), but WIGs may be bank-restricted because they fly close to the water (or ground) and because of their outriggers (pontoons) below the wingtips for water operation. Additionally, these embodiments can be used to provide more yaw authority beyond what is available from the rudder and introduce a side force to counteract skid. As another example, these embodiments can be used to improve management of cross winds. Strong cross winds are common and can introduce additional challenges for seagliders (or other craft) that may not have the ability to de-crab when landing using traditional mechanisms used in wheel-based aircraft (i.e., lowering the upwind wing and gear). The winglet control structures of these embodiments can be used to counter strong and/or gusting crosswinds to assist in landing without relying on traditional de-crab techniques.

Figure 19A:
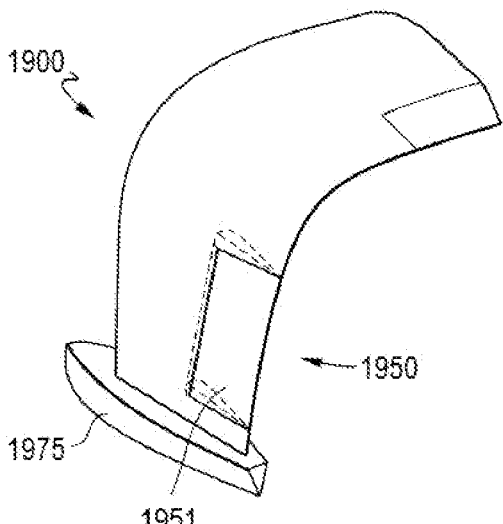
FIG. 19A is a rear, port view of a portion of a craft of an embodiment with a split-flap winglet control surface in a non-deployed position.
Figure 19B:
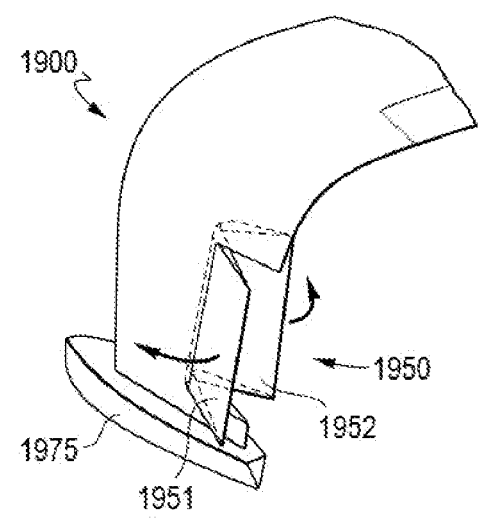
FIG. 19B is a rear, port view of a portion of a craft of an embodiment with a split-flap winglet control surface where both flaps are deployed.
Figure 19C:
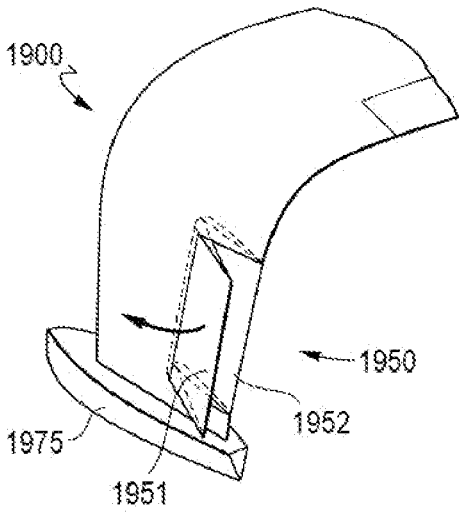
FIG. 19C is a rear, port view of a portion of a craft of an embodiment with a split-flap winglet control surface where only the port flap is deployed.
Figure 19D:
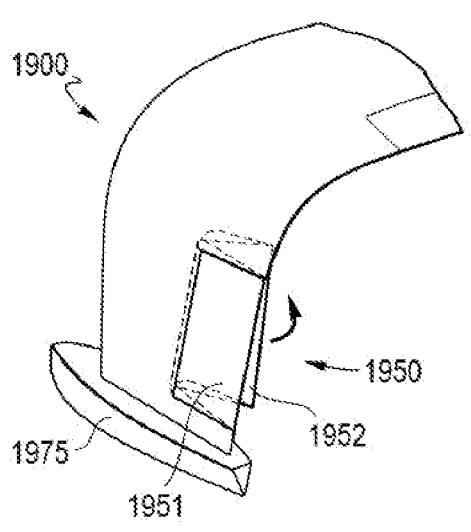
FIG. 19D is a rear, port view of a portion of a craft of an embodiment with a split-flap winglet control surface where only the starboard flap is deployed.
Figures 20A, 20B:
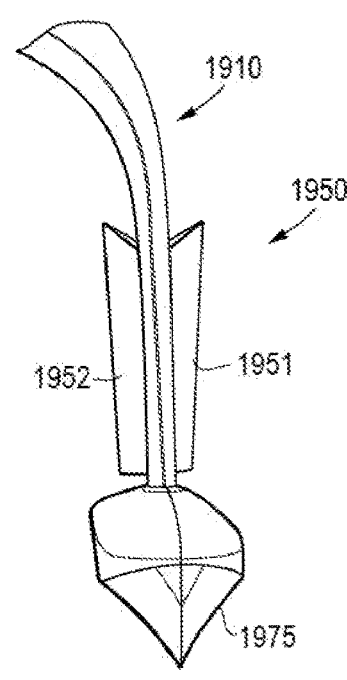
FIG. 20A is a front view of a portion of a craft of an embodiment with a split-flap winglet control surface where both flaps are deployed.
FIG. 20B is a rear, port view of a portion of a craft of an embodiment with a split-flap winglet control surface where both flaps are deployed.

There are many alternatives that can be used with these embodiments. For example, instead of the control surface being a single piece, a split-flap design can be used. This alternative is shown in FIGS. 19A-D and 20A-B. FIG. 19A shows a portion of a craft having a winglet 1900 that supports an outrigger 1975. The winglet 1900 has a split-flap control surface 1950 that is in a non-deployed position in FIG. 19A. FIGS. 19B, 20A, and 20B show the split-flap control surface 1950 in a deployed, V-shape position. In FIG. 19, the open split-flaps 1951, 1952 serve as an airbrake to slow down the craft. This can be desirable on landing to slow down the craft (by producing drag on the winglet 1900) without reducing the revolutions per minute (RPM) of the propellers (keeping the propellers running at a higher RPM can create more induced velocity and more lift over the wing to reduce the stall speed). Also, as shown in FIGS. 19C and 19D, the split-flap control surface 1950 can be configured so each flap 1951, 1952 is independently deployable to create a yawing moment/increase yaw authority beyond what is available from the rudder, which can help reduce the size of the rudder/tail. As another alternative, the split-flaps can be controlled substantially simultaneously to provide the side force described above. As yet another alternative, the winglet effectors that were described above to provide the side force can be used to provide air braking when both port and starboard winglet effectors are turned outward.

Figure 21A:
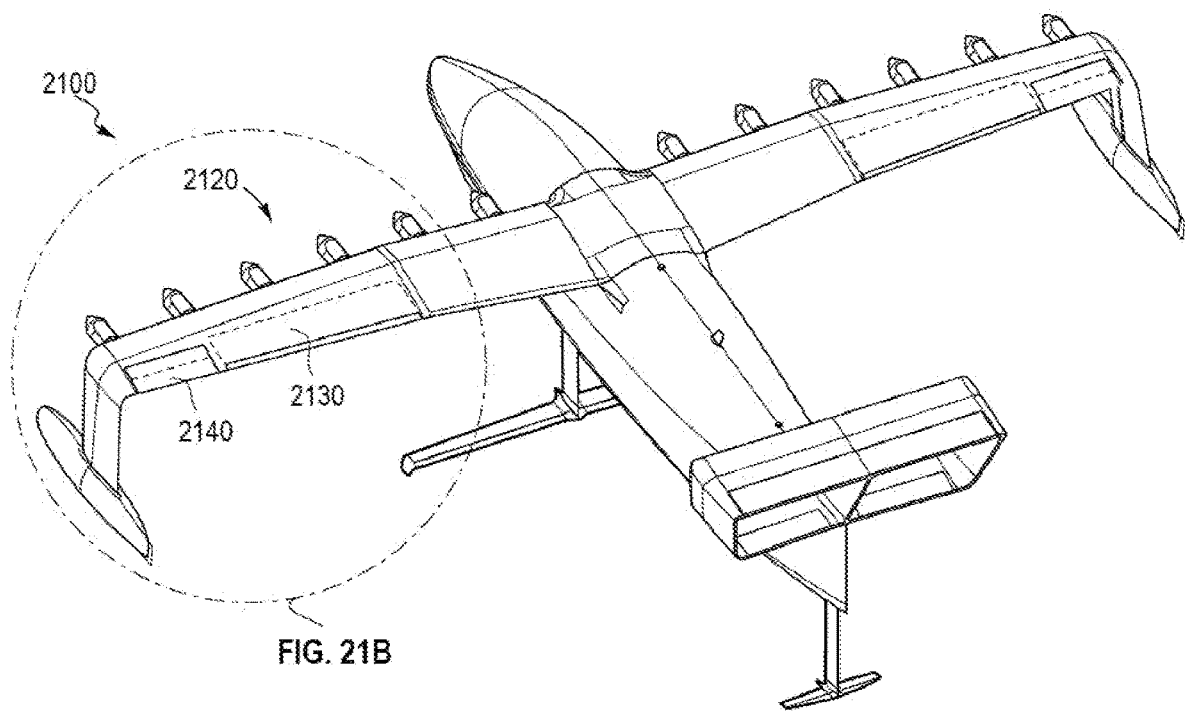
FIG. 21A is a rear, port view of a craft of an embodiment.
Figure 21B:
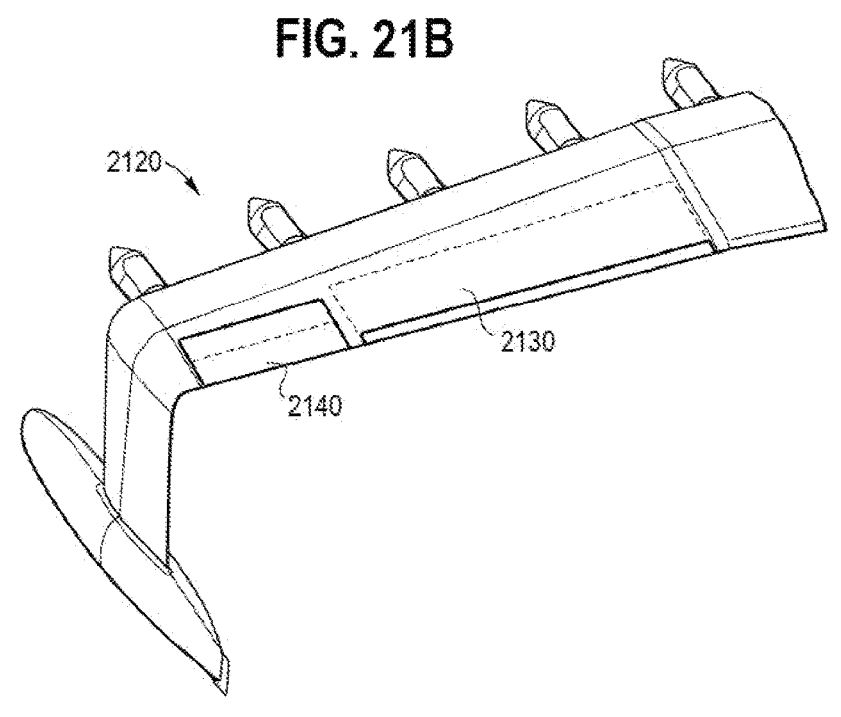
FIG. 21B is an exploded view of a portion of the craft in FIG. 21A.

In another alternative, a stand-alone aileron is provided, which may or may not be part of a winglet. As shown in FIGS. 21A and 21B, in one type of craft, the wing 2100 of the craft has flaps 2130 and ailerons 2140. The flaps 2130 are configured to extend downward below the main wing to reduce stall speed and create additional lift at low airspeeds. The ailerons 2140 are configured to extend upward above the main wing to decrease lift on one side of the main wing and induce a roll moment in the craft. The ailerons 2140 can also be configured to extend downward below the main wing in a flaperon configuration to help the flaps 2130 generate additional lift on the main wing, which can be used to either create a rolling moment or additional balanced lift depending on coordinated movement of both ailerons.

In one embodiment (shown in FIG. 22A), an additional stand-alone aileron 2250 is provided that can be used to provide effective roll control at low speeds. (Whereas the winglet control structures in the above embodiments can be used to generate a side force to avoid a roll, the stand-alone aileron 2250 of this embodiment can be used to increase a roll.) The stand-alone aileron 2250 can address a tradeoff between roll authority for takeoff versus cruise. Typically, roll control is addressed by introducing a narrow-span aileron as a percentage of the chord along the wing (see FIGS. 21A-B). The stand-alone aileron 2250 can provide additional roll control at low speed. The stand-alone aileron 2250 does not need to be the same width as a wing or the same chord. It can be, for example, 5-10% of the width of the wing, although other dimensions may be possible.

Figure 22A:
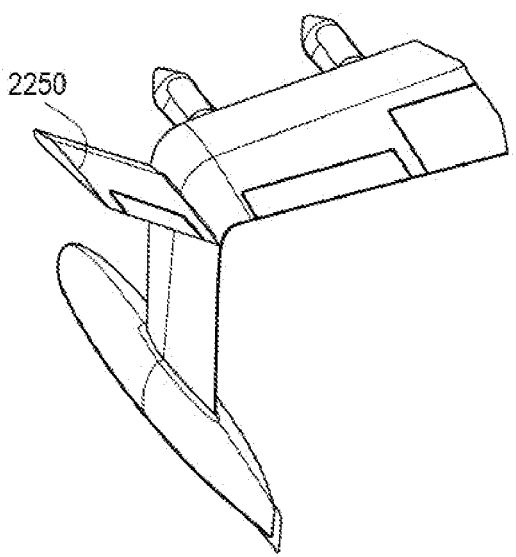
FIG. 22A is a rear, port view of a portion of a craft of an embodiment with a fixed stand-alone aileron.
Figure 22B:
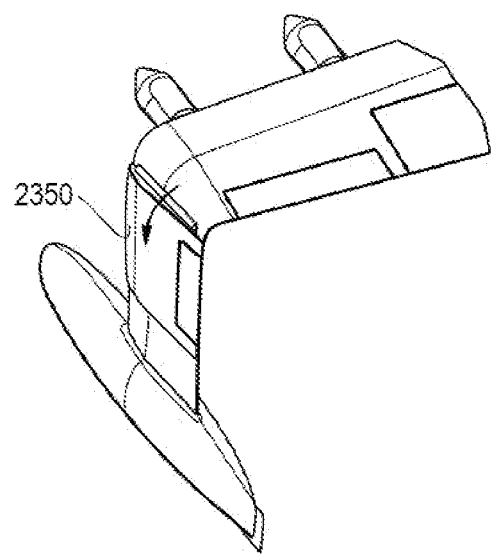
FIG. 22B is a rear, port view of a portion of a craft of an embodiment with a movable aileron in a non-deployed position.
Figure 22C:
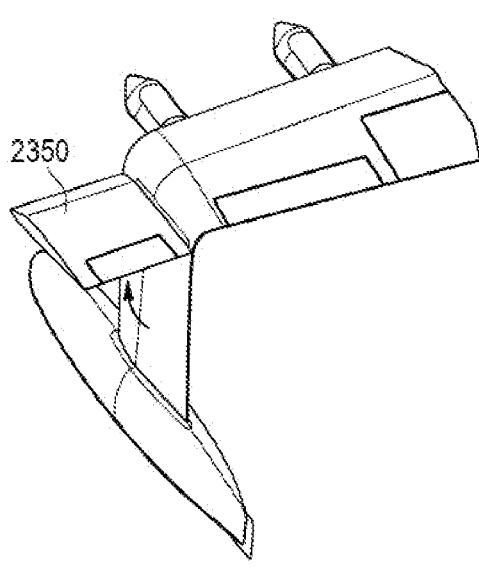
FIG. 22C is a rear, port view of a portion of a craft of an embodiment with a movable aileron in a deployed position.

Many variations are possible. For example, FIG. 22A shows the stand-alone aileron 2250 positioned outward at an angle from the winglet and is designed to provide additional roll and yaw control at low speed. In other embodiments (shown in FIGS. 22B-C), the stand-alone aileron 2350 folds out at an angle from the winglet for additional control at low speed.

A stand-alone aileron can provide benefits to any suitable type of craft, especially seagliders. For example, seagliders are designed to take off at speeds lower than a traditional aircraft, and traditional aileron designs that take up a significant portion of the chord of a wing are not efficient at both low and high speed. Therefore, a challenge exists to develop designs with ailerons that work efficiently at both low and high speeds. A dedicated stand-alone aileron that is affixed or movable with respect to a winglet can provide additional control at low speeds, while traditional ailerons incorporated in the wing alone can be used for sufficient control at high-speeds. So, stand-alone aileron can provide improved control at relatively-slow speeds including takeoff, as well as allow efficient roll-control at both low and high speeds.

VI. Conclusion

While the systems and methods of operation have been described with reference to certain examples, it will be understood by those skilled in the art that various changes can be made, and equivalents can be substituted without departing from the scope of the claims. Therefore, it is intended that the present methods and systems not be limited to the particular examples disclosed, but that the disclosed methods and systems include all embodiments falling within the scope of the appended claims.

What is claimed is:

1. A craft comprising:
a body defining a longitudinal axis; and
a wing defining a lateral axis, the wing comprising first and second winglets comprising respective winglet effectors positioned to cause a side force along the lateral axis when the winglet effectors are deployed in a same direction, wherein the lateral axis is perpendicular to the longitudinal axis and runs through a center of mass of the craft, and wherein the side force is toward the center of mass of the craft so as to not cause a yawing moment on the craft.

2. The craft of claim 1, wherein the winglet effectors are positioned to cause a yawing moment on the craft when only one of the winglet effectors is deployed.

3. The craft of claim 1, wherein the first and second winglets are substantially perpendicular to the lateral axis.

4. The craft of claim 1, wherein the first and second winglets are bent downward with respect to the wing.

5. The craft of claim 1, further comprising:
at least one actuator configured to move the winglet effectors between deployed and non-deployed positions;
a sensor;
at least one processor; and
at least one memory storing computer-readable program code that, when executed by the at least one processor, causes the at least one processor to control the at least one actuator to move the winglet effectors from the non-deployed position to the deployed positions in response to a reading from the sensor.

6. The craft of claim 5, wherein the sensor comprises an accelerometer.

7. The craft of claim 5, wherein the sensor comprises a wave state estimator.

8. The craft of claim 5, wherein the sensor comprises radar.

9. The craft of claim 5, wherein the sensor comprises lidar.

10. The craft of claim 5, wherein the sensor comprises a location sensor.

11. A craft comprising:
a body defining a longitudinal axis;
a wing defining a lateral axis; and
port and starboard control surfaces positioned to cause a side force along the lateral axis when the port and starboard control surfaces are deployed in a same direction, wherein the lateral axis is perpendicular to the longitudinal axis and runs through a center of mass of the craft, and wherein the side force is toward the center of mass of the craft so as to not cause a yawing moment on the craft.

12. The craft of claim 11, wherein the wing comprises port and starboard winglets.

13. The craft of claim 12, wherein the port and starboard control surfaces are only a part of the port and starboard winglets.

14. The craft of claim 11, further comprising outriggers.

15. A method comprising:
performing, in a craft comprising a body defining a longitudinal axis, a wing defining a lateral axis, and first and second control surfaces positioned to cause a side force along the lateral axis when the first and second control surfaces are deployed in a same direction, wherein the lateral axis is perpendicular to the longitudinal axis and runs through a center of mass of the craft, and wherein the side force is toward the center of mass of the craft so as to not cause a yawing moment on the craft:
determining a need to apply the side force along the lateral axis; and
actuating the first and second control surfaces to apply the side force along the lateral axis.

16. The method of claim 15, further comprising returning the first and second control surfaces to a non-deployed position in response to determining there is no longer the need to apply the side force along the lateral axis.

17. The method of claim 15, wherein the need is determined in response to detecting an unintended change in a lateral position of the craft.

18. The method of claim 15, wherein the need is determined in response to detecting a side skid.

19. The method of claim 15, wherein the need is determined in response to an estimated wave height exceeding a threshold.

20. The method of claim 15, wherein the need is determined in response to predicting a possible collision.

\* \* \* \* \*